United States Patent
Kim et al.

(10) Patent No.: US 10,849,028 B2
(45) Date of Patent: Nov. 24, 2020

(54) METHOD FOR DETERMINING EMM MODE IN WIRELESS COMMUNICATION SYSTEM, AND APPARATUS THEREFOR

(71) Applicant: LG ELECTRONICS INC., Seoul (KR)

(72) Inventors: Taehun Kim, Seoul (KR); Sangwook Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/338,666

(22) PCT Filed: Oct. 27, 2017

(86) PCT No.: PCT/KR2017/011994
§ 371 (c)(1),
(2) Date: Apr. 1, 2019

(87) PCT Pub. No.: WO2018/080230
PCT Pub. Date: May 3, 2018

(65) Prior Publication Data
US 2019/0246318 A1 Aug. 8, 2019

Related U.S. Application Data

(60) Provisional application No. 62/414,756, filed on Oct. 30, 2016, provisional application No. 62/421,356, (Continued)

(51) Int. Cl.
*H04W 36/00* (2009.01)
*H04W 76/19* (2018.01)
(Continued)

(52) U.S. Cl.
CPC ......... *H04W 36/0055* (2013.01); *H04W 8/08* (2013.01); *H04W 48/08* (2013.01); *H04W 76/19* (2018.02)

(58) Field of Classification Search
CPC .................................................. H04W 36/0055
See application file for complete search history.

(56) References Cited

U.S. PATENT DOCUMENTS

2018/0310359 A1* 10/2018 Takahashi ............. H04W 76/27
2018/0376531 A1* 12/2018 Martinez Tarradell ......................
H04W 76/27
(Continued)

FOREIGN PATENT DOCUMENTS

JP      2016139715 A      8/2016

OTHER PUBLICATIONS

NTT Docomo, "Handling of CIoT support parameters in SIB2", C1-163305, 3GPP TSG-CT WG1 Meeting #99, Tenerife, Spain, Jul. 25-29, 2016, See Reason for Change; and section 5.3.1.3.
(Continued)

*Primary Examiner* — Edan Orgad
*Assistant Examiner* — Won Tae C Kim
(74) *Attorney, Agent, or Firm* — Dentons US LLP

(57) ABSTRACT

A method and a device for determining an evolved packet system (EPS) mobility management (EMM) mode in a wireless communication system are disclosed. More specifically, a method for determining, by a user equipment (UE), an EMM mode in a wireless communication system includes receiving, by the UE in an EMM-IDLE mode with suspend indication, from a base station a system information block (SIB) including information that a serving cell of the UE does not support user plane (UP) cellular Internet of Things (CIoT) EPS optimization; storing the information that the serving cell does not support the UP CIoT EPS optimization; and maintaining the EMM-IDLE mode with suspend indication if a procedure using an initial non-access stratum (NAS) message is not triggered and the serving cell is changed to a cell supporting the UP CIoT EPS optimization.

7 Claims, 17 Drawing Sheets

Related U.S. Application Data filed on Nov. 13, 2016, provisional application No. 62/423,203, filed on Nov. 17, 2016.

(51) Int. Cl.
*H04W 8/08* (2009.01)
*H04W 48/08* (2009.01)

(56) References Cited

U.S. PATENT DOCUMENTS

2019/0037441 A1* 1/2019 Liu ................ H04W 60/00
2019/0200265 A1* 6/2019 Yu ................. H04W 76/10

OTHER PUBLICATIONS

Intel, "Alignment for consistent use of term "Control plane" and "User plane"", C1-163807, 3GPP TSG-CT WG1 Meeting #99, Tenerife, Spain, Jul. 25-29, 2016, See pp. 7-36.

NTT Docomo, "Handling of CIoT support parameters in SIB2", C1-163304, 3GPP TSG-CT WG1 Meeting #99, Tenerife, Spain, Jul. 25-29, 2016, See sections 5.3.1.3-5.6.1.2.2.

Intel Corporation, "Connected mode mobility for NB-IOT UE using CP CIoT EPS optimisation", R2-166683, 3GPP TSG-RAN WG2 #95bis, Kaohsiung, Taiwan, Oct. 10-14, 2016, See sections 2.1-2.3.

NEC, "Reply LS on overload control for CP CIoT EPS optimization", R2-167099, 3GPP TSG-RAN WG2 Meeting #95bis, Kaohsiung, Taiwan, Oct. 10-14, 2016, See section 1.

C1-164173: NTT Docomo: Meeting #100, "UE behaviour in the cell not supporting user plane CIoT EPS optimization" 3GPP Draft; France vol. CT WG1, No. Guilin (P.R. of China) Oct. 17, 2016 to Oct. 21, 2016 Retrieved from the Internet: URL:http://www.3gpp.org/ftp/Meetings_3GPP_SYNC/CT1/Docs/ retrieved on Oct. 16, 2016 (2 Pages).

XP051172725: 3rd Generation Partnership Project: Technical Specification Group Core Network and Terminals; Non-Access-Stratum (NAS) protocol for Evolved Packet System (EPS) StaGE 3 (Release 14) 3GPP Standard; 3GPP TS 24.301, 3rd Generation Partnership Project; France; vol. CT WG1, No. V14.1.0, (Section 5.3.1.3) Sep. 30, 2016 (3 Pages) retrieved Sep. 30, 2016.

* cited by examiner

【Figure 1】
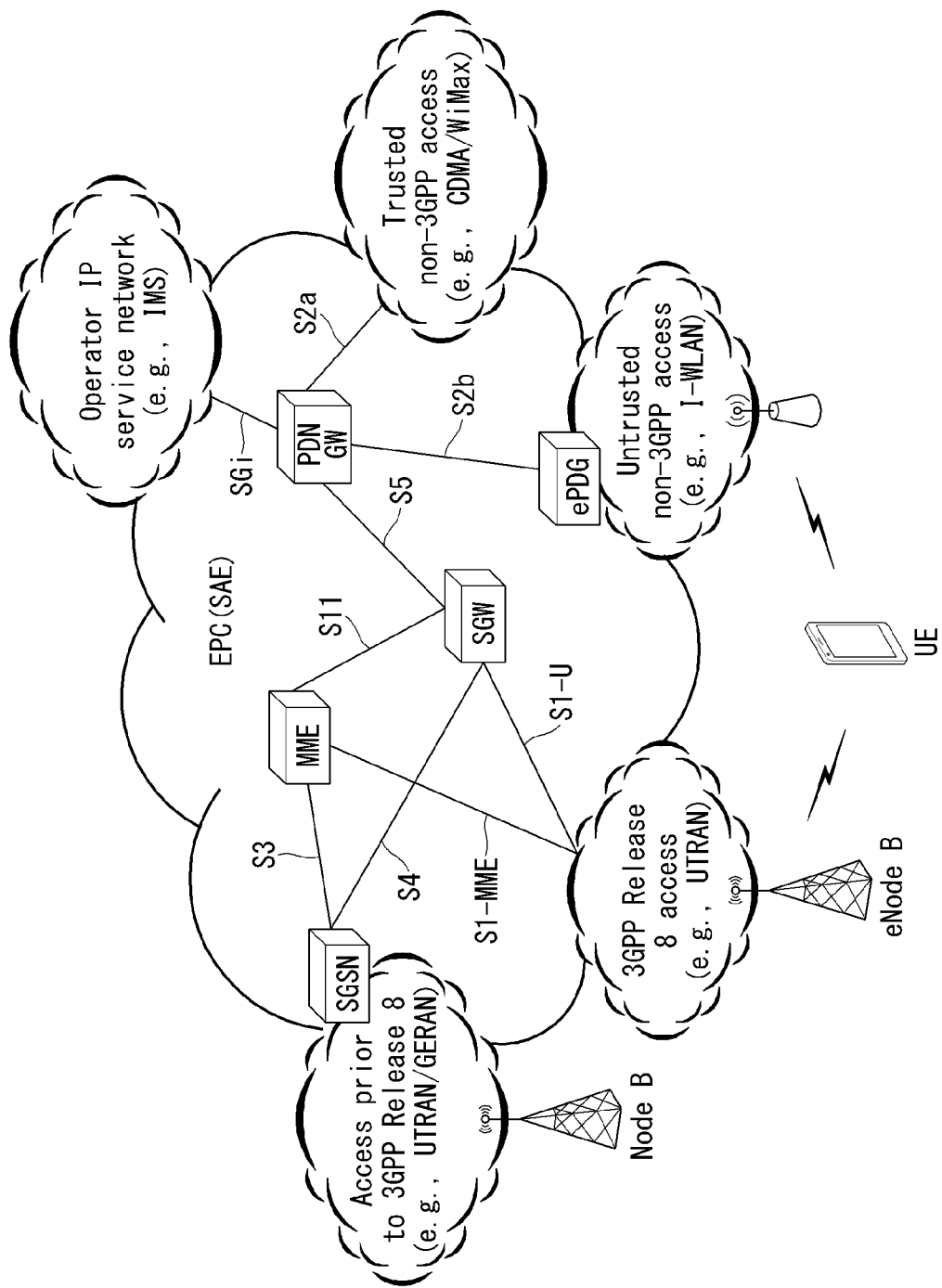

[Figure 2]
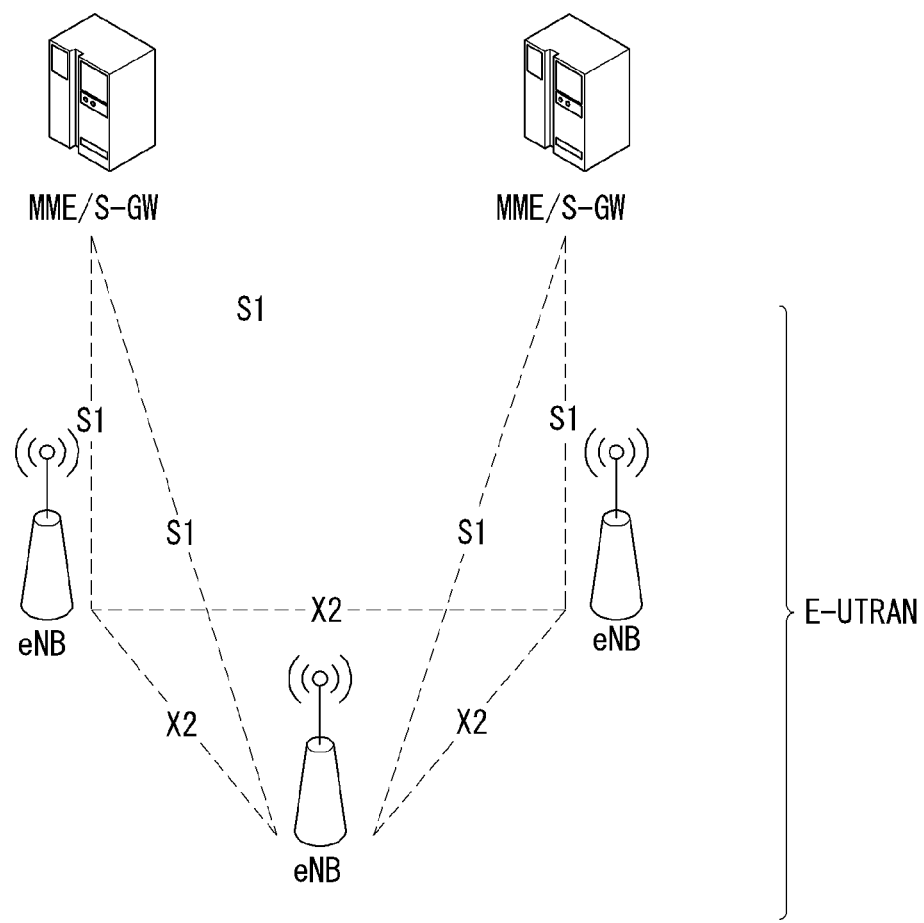

【Figure 3】
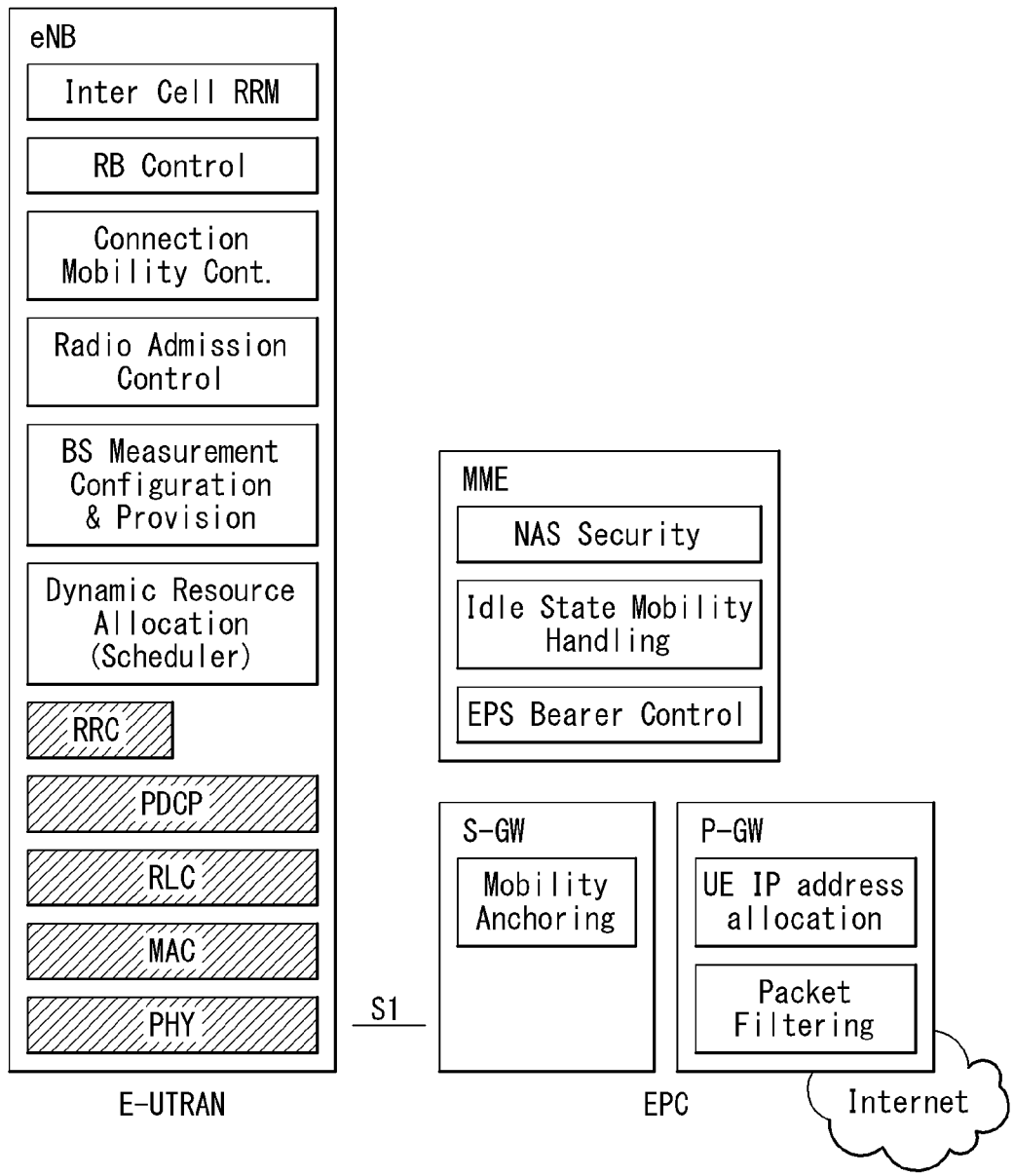

[Figure 4]
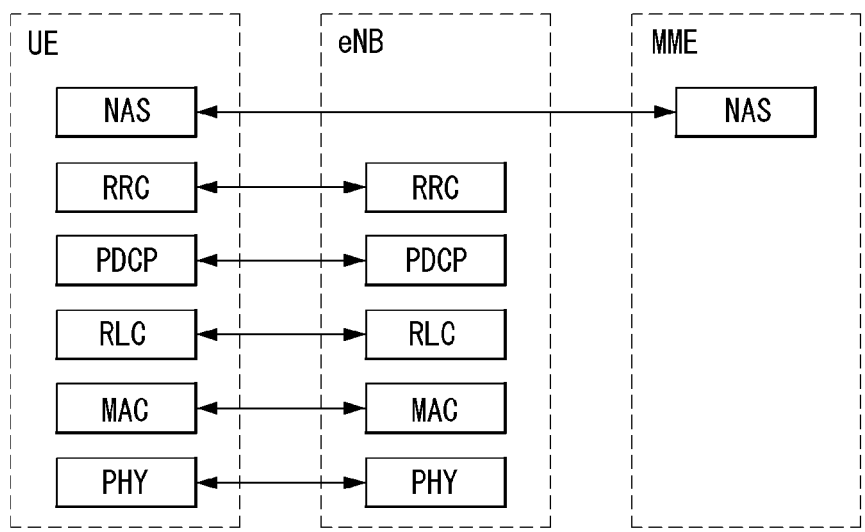
(a) Control plane protocol stack
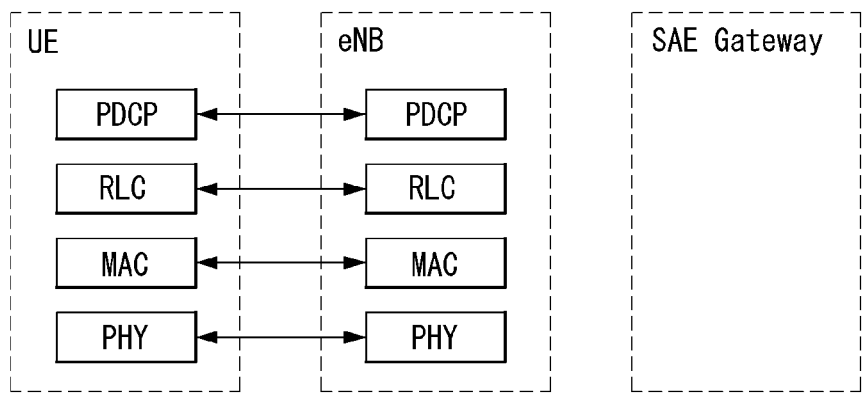
(b) User plane protocol stack 【Figure 5】
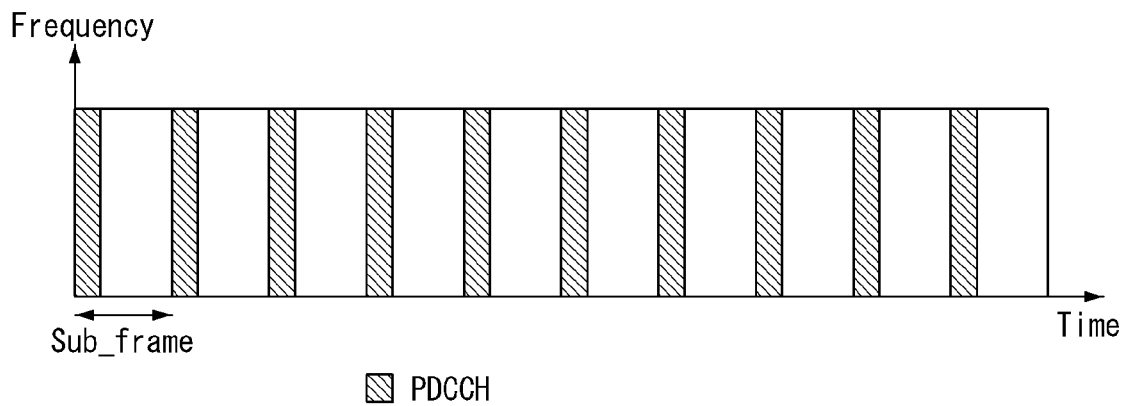
【Figure 6】
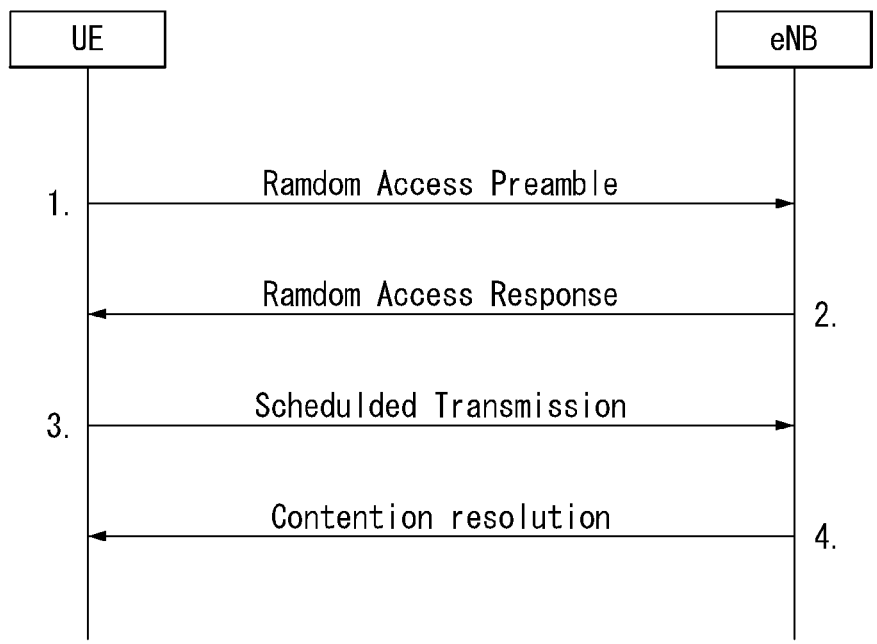

【Figure 7】
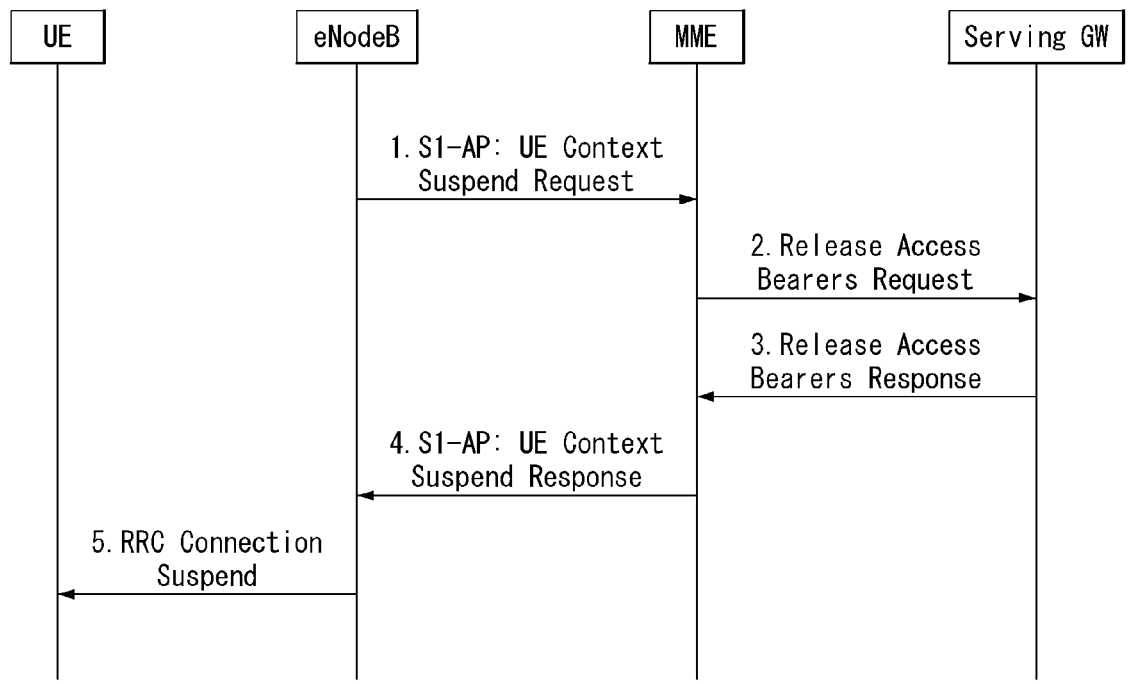

【Figure 8】
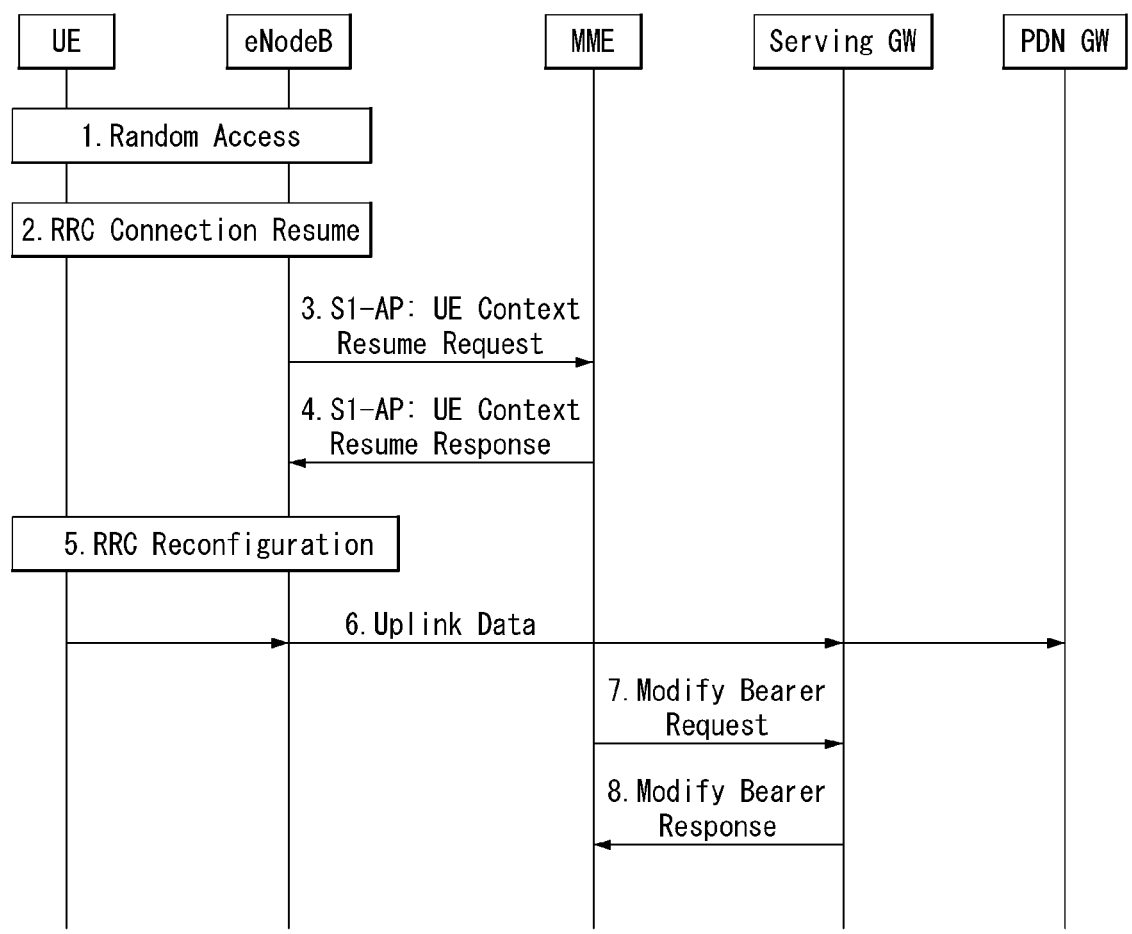

[Figure 9]
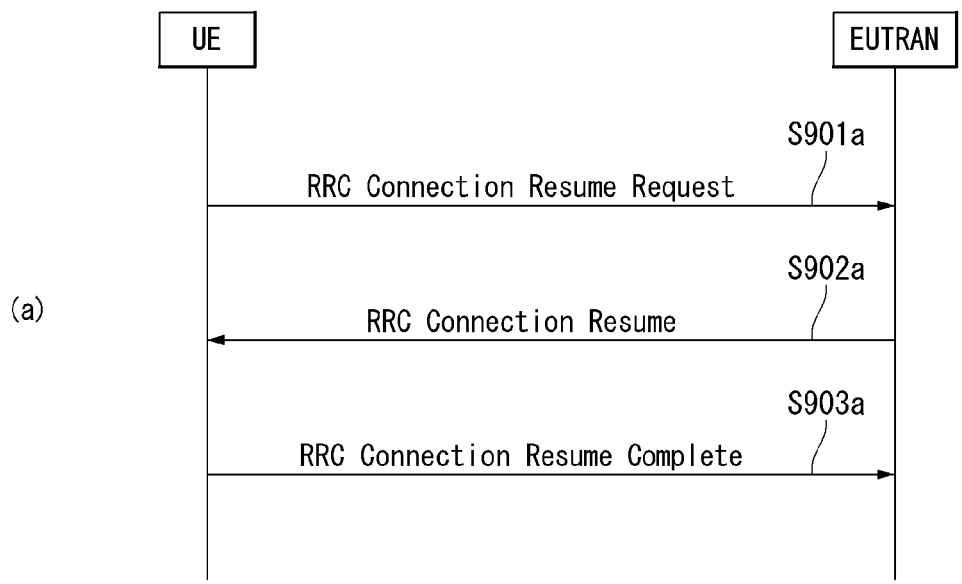
(a)
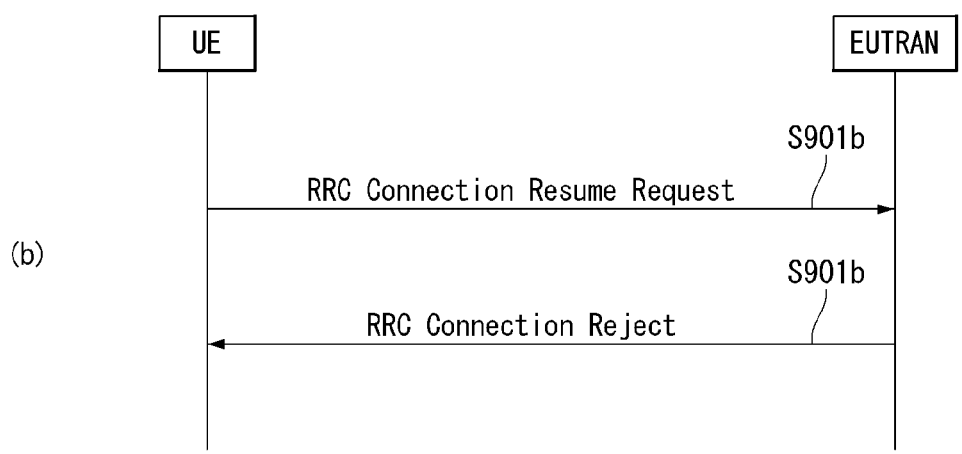
(b)

[Figure 10]
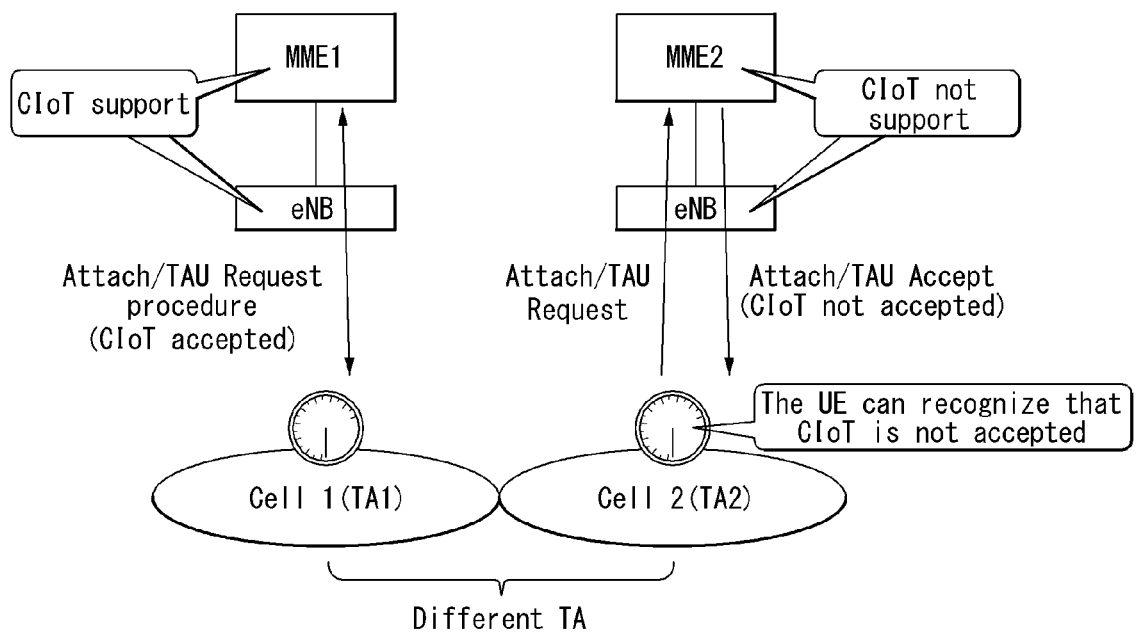

【Figure 11】
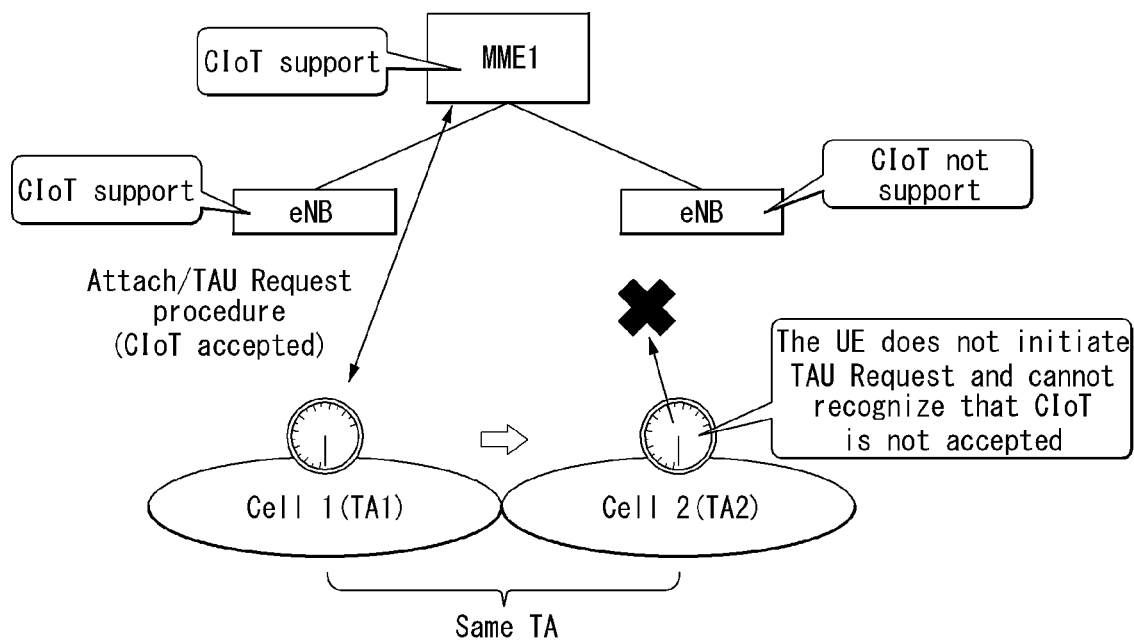

【Figure 12】
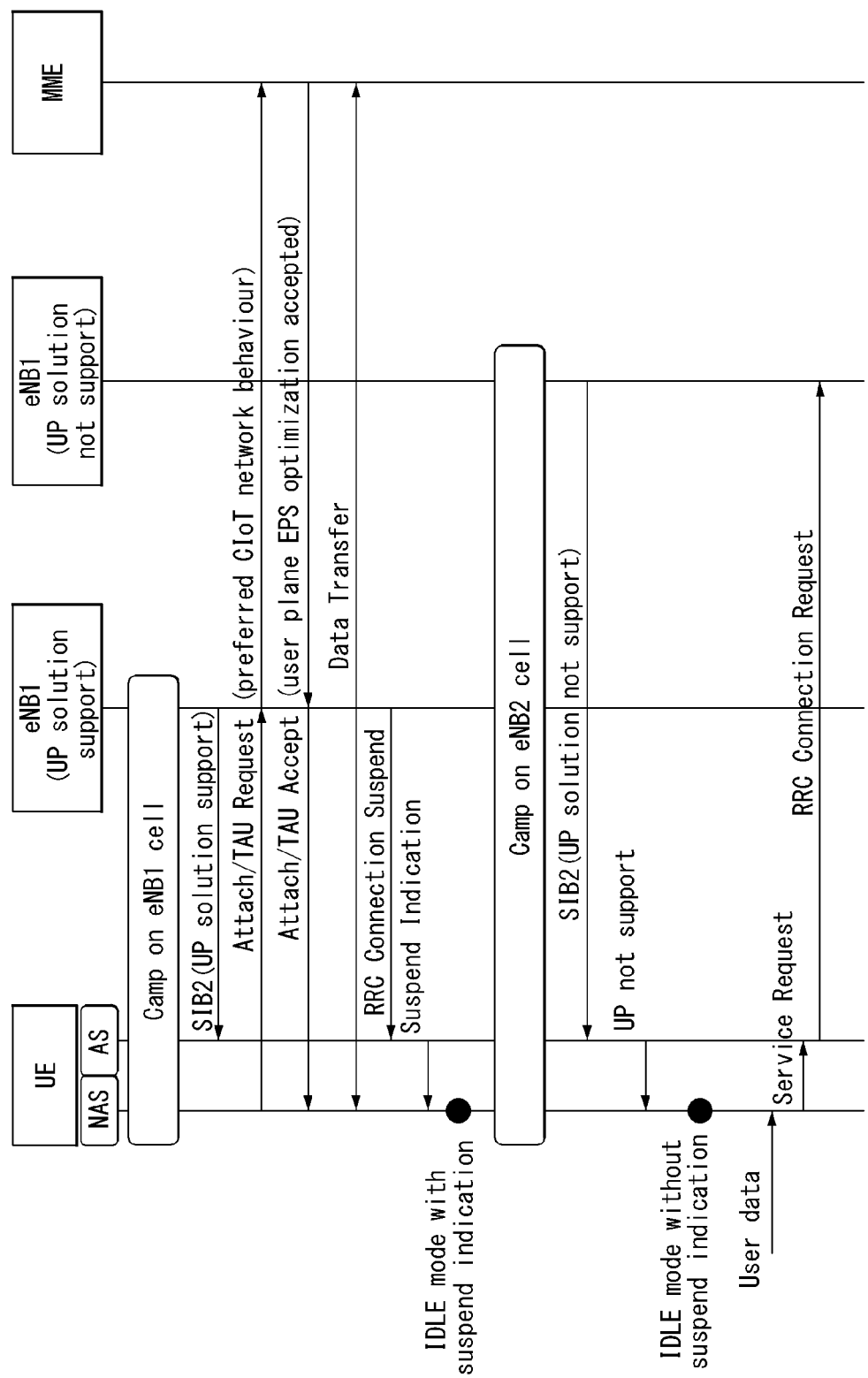

[Figure 13]
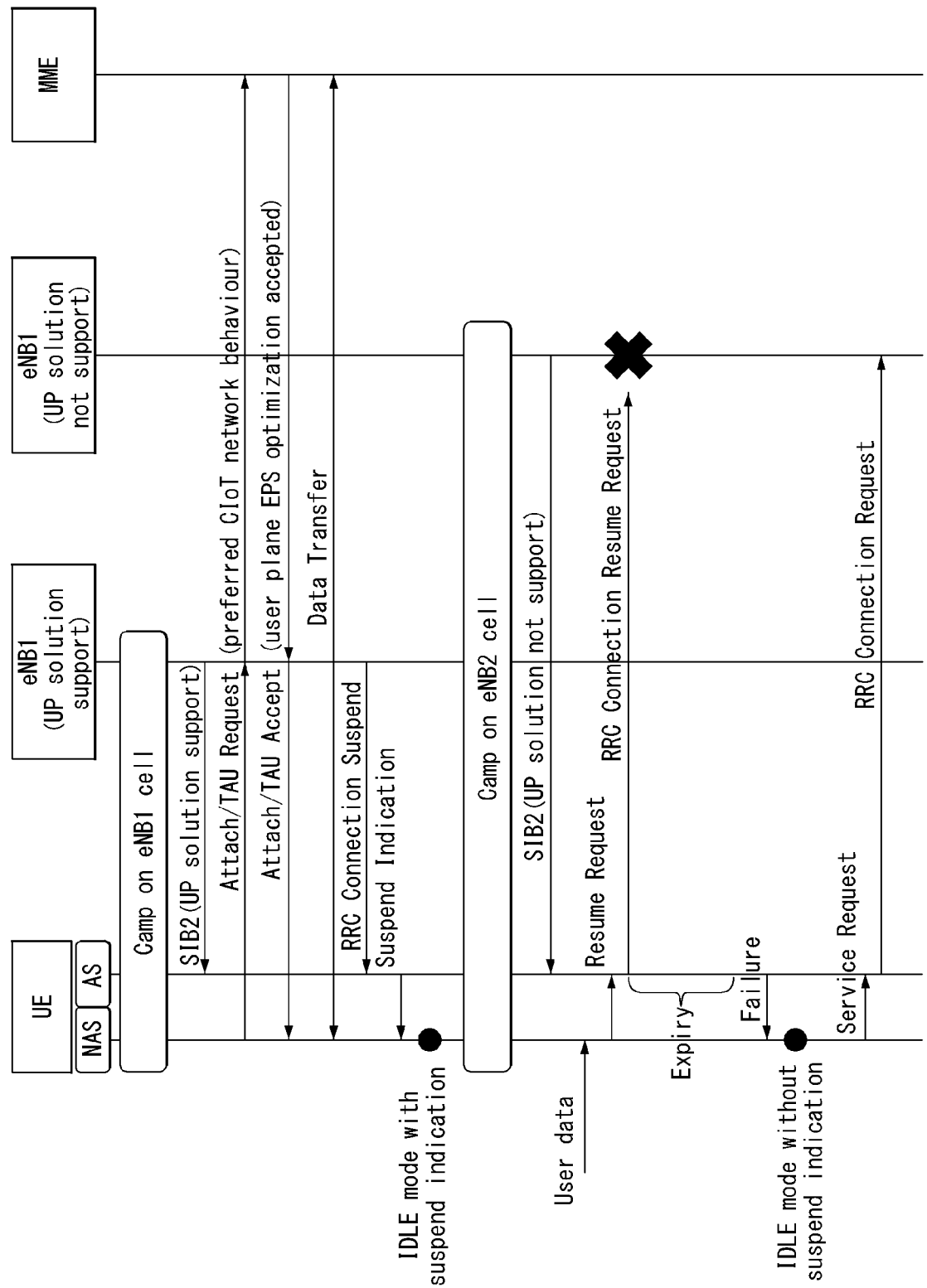

[Figure 14]
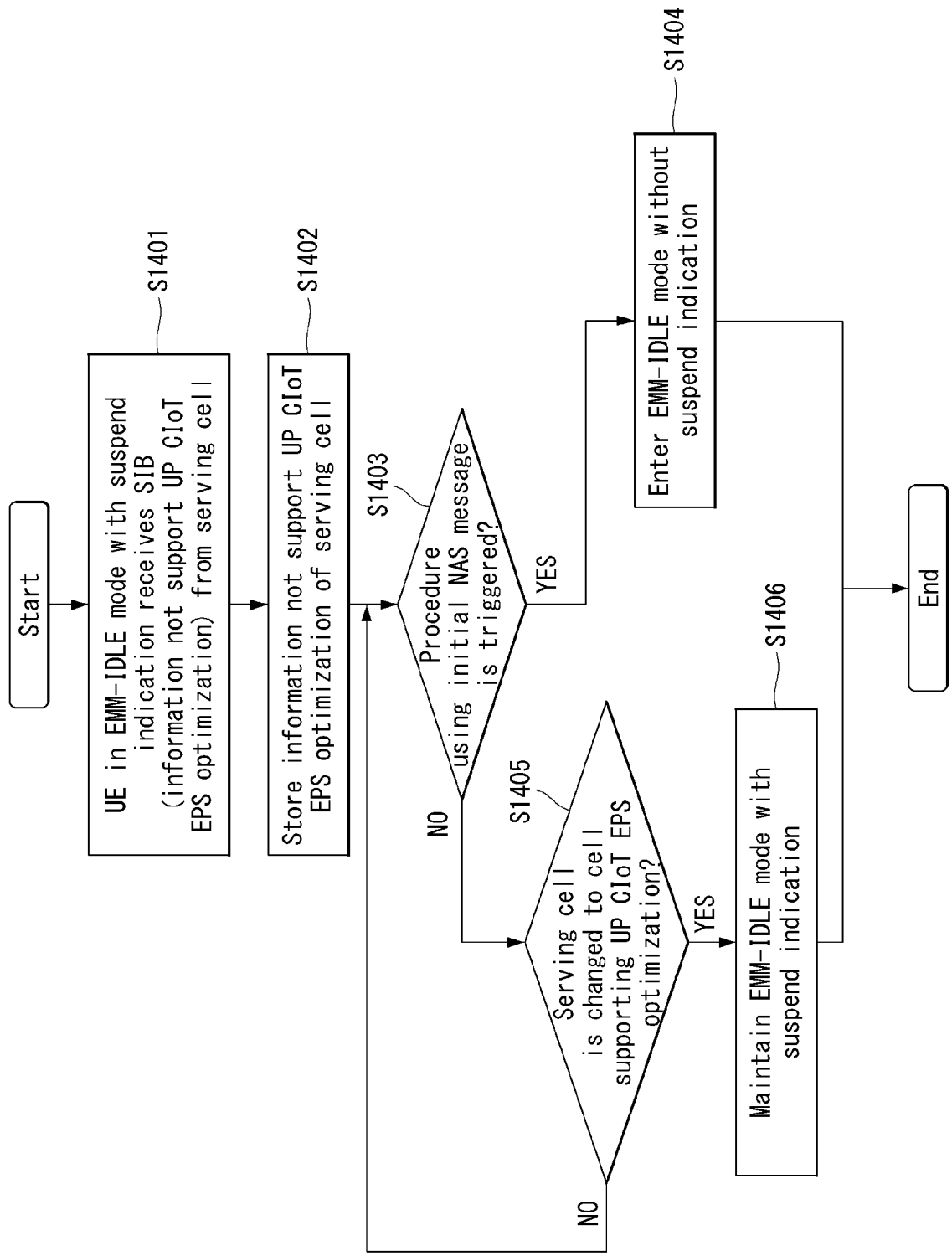

[Figure 15]
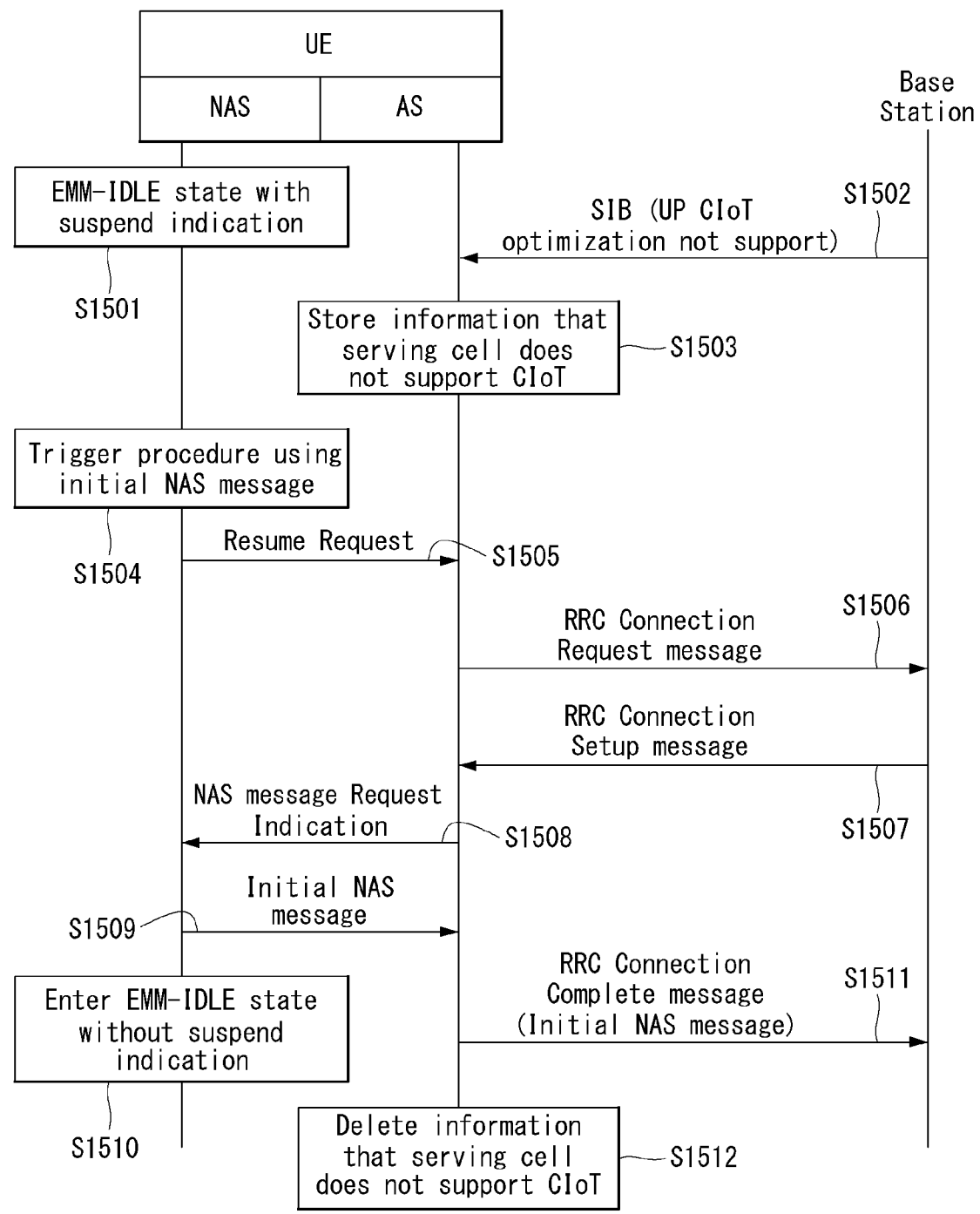

[Figure 16]
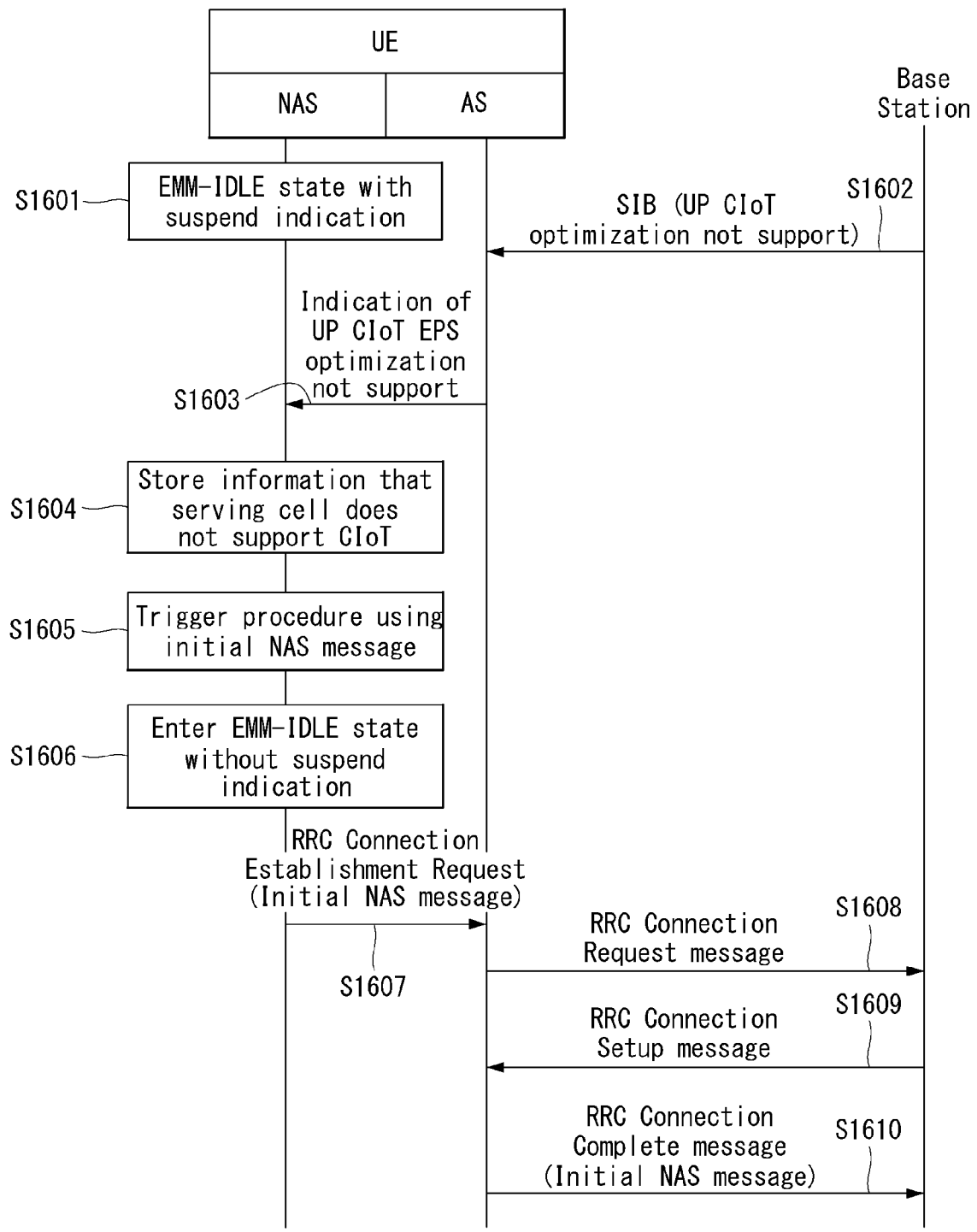

[Figure 17]
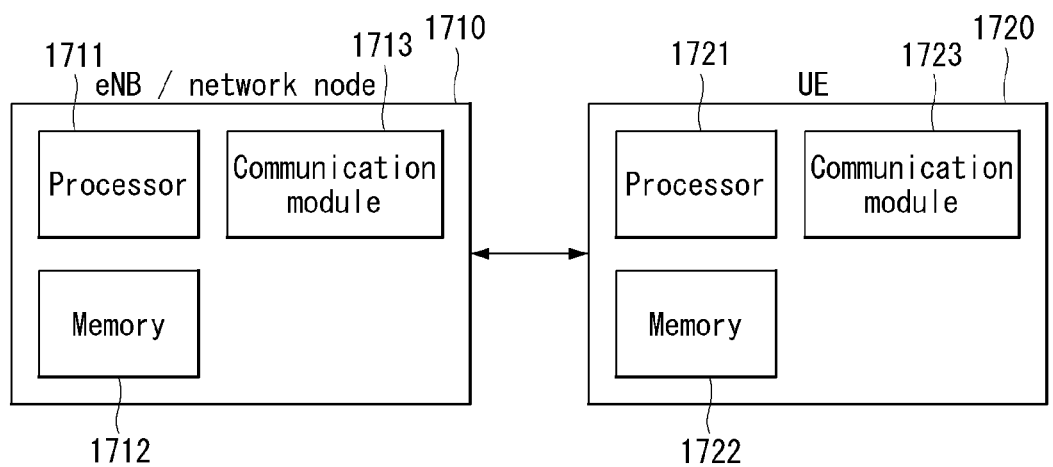

【Figure 18】
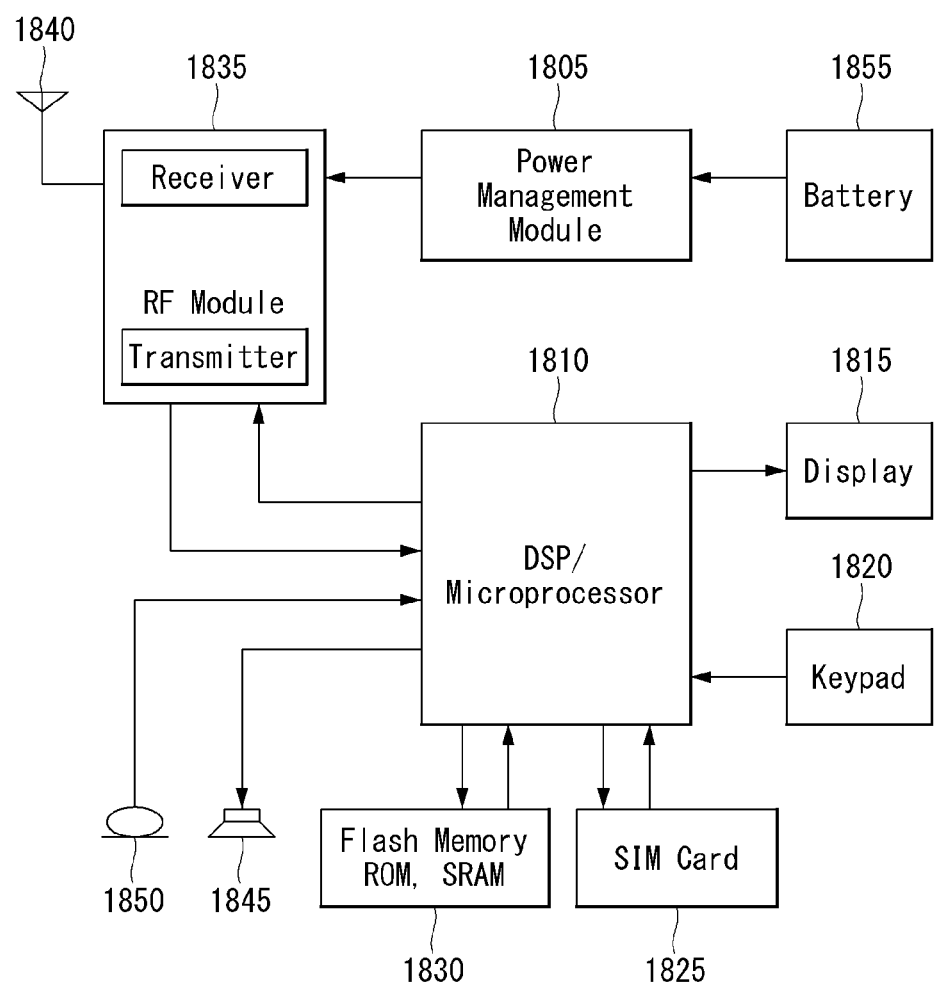

METHOD FOR DETERMINING EMM MODE IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/011994, filed on Oct. 27, 2017, which claims the benefit of U.S. Provisional Application No. 62/414,756, filed on Oct. 30, 2016, No. 62/421,356, filed on Nov. 13, 2016, No. 62/423,203, filed on Nov. 17, 2016, the contents of which are all hereby incorporated by reference herein in their entirety.

TECHNICAL FIELD

The present invention relates to a wireless communication system, and more particularly to a method for determining, by a user equipment (UE) and/or a mobility management entity (MME), an evolved packet system (EPS) mobility management (EMM) mode and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method for determining, by a UE and/or a MME, an EMM mode.

An object of the present invention is to provide a behaviour of a UE and/or a MME when the UE suspended in a cell supporting user plane (UP) EPS cellular Internet of Things (CIoT) optimization has moved to a cell not supporting the UP EPS CIoT optimization.

Technical problems to be solved by the present invention are not limited by the above-mentioned technical problems, and other technical problems which are not mentioned above can be clearly understood from the following description by those skilled in the art to which the present invention pertains.

Technical Solution

In one aspect, there is provided a method for determining, by a user equipment (UE), an evolved packet system (EPS) mobility management (EMM) mode in a wireless communication system, the method comprising receiving, by the UE in an EMM-IDLE mode with suspend indication, from a base station a system information block (SIB) including information that a serving cell of the UE does not support user plane (UP) cellular Internet of Things (CIoT) EPS optimization; storing the information that the serving cell does not support the UP CIoT EPS optimization; and maintaining the EMM-IDLE mode with suspend indication if a procedure using an initial non-access stratum (NAS) message is not triggered and the serving cell is changed to a cell supporting the UP CIoT EPS optimization.

In another aspect, there is provided a user equipment (UE) for determining an evolved packet system (EPS) mobility management (EMM) mode in a wireless communication system, the UE comprising a communication module configured to transmit and receive a signal; and a processor configured to control the communication module, wherein the processor is configured to receive, by the UE in an EMM-IDLE mode with suspend indication, from a base station a system information block (SIB) including information that a serving cell of the UE does not support user plane (UP) cellular Internet of Things (CIoT) EPS optimization, store the information that the serving cell does not support the UP CIoT EPS optimization, and maintain the EMM-IDLE mode with suspend indication if a procedure using an initial non-access stratum (NAS) message is not triggered and the serving cell is changed to a cell supporting the UP CIoT EPS optimization.

Preferably, if the procedure using the initial NAS message is not triggered and the serving cell is changed to the cell supporting the UP CIoT EPS optimization, the information that the serving cell does not support the UP CIoT EPS optimization may be deleted.

Preferably, after the procedure using the initial NAS message is triggered, a NAS layer of the UE may enter the EMM-IDLE mode without suspend indication.

Preferably, an access stratum (AS) layer of the UE may store the information that the serving cell does not support the UP CIoT EPS optimization.

Preferably, even if the NAS layer of the UE requests the AS layer of the UE to resume a radio resource control (RRC) connection while the information that the serving cell does not support the UP CIoT EPS optimization is stored, the AS layer of the UE may send a RRC connection request message to the base station.

Preferably, if the AS layer of the UE receives from the base station a RRC connection setup message as a response to the RRC connection request message, the AS layer of the UE may transmit a request of the initial NAS message to the NAS layer of the UE.

Preferably, the request of the initial NAS message may be an indication that a RRC connection resume has fallbacked.

Preferably, if the NAS layer of the UE receives the request of the initial NAS message, the NAS layer of the UE may send the initial NAS message to the AS layer of the UE and enter the EMM-IDLE mode without suspend indication.

Preferably, the AS layer of the UE may deliver to the NAS layer of the UE the information that the serving cell does not support the UP CIoT EPS optimization.

Preferably, the NAS layer of the UE may store the information that the serving cell does not support the UP CIoT EPS optimization.

Advantageous Effects

According to embodiments of the present invention, a UE and/or a MME can efficiently determine an EMM mode.

Embodiments of the present invention can prevent unnecessary delay and signaling resulting from unnecessary change in an EMM mode when a UE suspended in a cell supporting UP EPS CIoT optimization moves to a cell not supporting the UP EPS CIoT optimization.

Embodiments of the present invention can reduce signaling and related processing load in a network by changing an EMM mode if absolutely necessary when a UE suspended in a cell supporting UP EPS CIoT optimization moves to a cell not supporting the UP EPS CIoT optimization.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention is applicable.

FIG. 2 illustrates an example of evolved universal terrestrial radio access network structure to which the present invention is applicable.

FIG. 3 exemplifies a structure of E-UTRAN and EPC in a wireless communication system to which the present invention is applicable.

FIG. 4 illustrates a structure of a radio interface protocol between a UE and E-UTRAN in a wireless communication system to which the present invention is applicable.

FIG. 5 is a diagram schematically showing a structure of a physical channel in a wireless communication system to which the present invention is applicable.

FIG. 6 is a diagram for describing a contention based random access procedure in a wireless communication system to which the present invention is applicable.

FIG. 7 illustrates a connection suspend procedure initiated by a base station in a wireless communication system to which the present invention is applicable.

FIG. 8 illustrates a connection resume procedure initiated by a UE in a wireless communication system to which the present invention is applicable.

FIG. 9 illustrates a RRC connection resume procedure in a wireless communication system to which the present invention is applicable.

FIG. 10 illustrates a scenario where a UE moves to a cell not supporting CIoT optimization belonging to a different TA in a wireless communication system to which the present invention is applicable.

FIG. 11 illustrates a scenario where a UE moves to a cell not supporting CIoT optimization belonging to the same TA in a wireless communication system to which the present invention is applicable.

FIG. 12 illustrates a method of using the support of an UP solution in SIB2 in a wireless communication system to which the present invention is applicable.

FIG. 13 illustrates a method for releasing a suspend mode after the failure of a RRC connection resume request in a wireless communication system to which the present invention is applicable.

FIG. 14 illustrates a method for determining a mode of a UE according to an embodiment of the present invention.

FIG. 15 illustrates a method for determining a mode of a UE according to an embodiment of the present invention.

FIG. 16 illustrates a method for determining a mode of a UE according to an embodiment of the present invention.

FIG. 17 illustrates a block configuration diagram of a communication device according to an embodiment of the present invention.

FIG. 18 illustrates a block configuration diagram of a communication device according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention may be embodied without the specific information.

For some cases, to avoid obscuring the technical principles of the present invention, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC- FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention may be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention may be supported by the documents above. Also, all of the terms disclosed in this document may be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It may be installed inside or outside a mobile communication network. It may provide an interface through which an MTC user may access the server. Also, an MTC server may provide MTC-related services to other servers (in the form of Services Capability Server (SCS)) or the MTC server itself may be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier includes a domain identifier and a local identifier as described below.

Domain identifier: an identifier used for identifying a domain in the control region of a mobile communication network service provider. A service provider may use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS may perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN may be formed separately for each operator.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention may be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC includes various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, if UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW may support policy enforcement features, packet filtering, charging support, and so on. Also, the PDN GW may act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability may access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |

TABLE 1-continued

| Reference point | Description |
| --- | --- |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention may be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention may be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention may be applied.

FIG. 4(a) illustrates a radio protocol structure for the control plane, and FIG. 4(b) illustrates a radio protocol structure for the user plane.

Referring to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH may carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, if MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention may be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention may be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Terms used in this specification are described below.

Dedicated bearer: an EPS bearer associated with an uplink packet filter(s) within a UE and a downlink packet filter(s) within a P-GW. In this case, only a specific packet is matched with the filter(s).

Default bearer: an EPS bearer established even new PDN connection. Context of a default bearer is maintained during the lifetime of a PDN connection.

EPS mobility management (EMM)-EMM-NULL state: an EPS service within a UE is deactivated. Any EPS mobility management function is not performed.

EMM-DEREGISTERED state: in the EMM-DEREGISTERED state, EMM context is not established and an MME is not notified of a UE location. Accordingly, the UE is unreachable by the MME. In order to establish EMM context, the UE needs to start an Attach or combined Attach procedure.

EMM-REGISTERED state: In the EMM-REGISTERED state, EMM context within a UE has been established and default EPS bearer context has been activated. When a UE is in the EMM-IDLE mode, an MME is notified of a UE location with accuracy of a list of TAs including a specific number of a TA. The UE may initiate the transmission and reception of user data and signaling information and may respond to paging. Furthermore, a TAU or combined TAU procedure is performed.

EMM-CONNECTED mode: When NAS signaling connection is established between the UE and the network, the UE is in the EMM-CONNECTED mode. A term of EMM-CONNECTED may be referred to as a term of an ECM-CONNECTED state.

EMM-IDLE mode: When the NAS signaling connection is not present between the UE and the network (i.e., EMM-IDLE mode without a suspend indication) or RRC connection suspend has been indicated by a lower layer (i.e., EMM-IDLE mode involving the suspend indication), the UE is in the EMM-IDLE mode. A term of EMM-IDLE may be referred to as a term of an ECM-IDLE state.

EMM context: If an attach procedure is successfully completed, the EMM context is established in the UE and the MME.

Control plane CIoT EPS optimization: Signaling optimization to enable efficient transport of user data (IP, non-IP or SMS) through a control plane via the MME. The control plane CIoT EPS optimization may optionally include header compression of IP data.

User plane CIoT EPS optimization: Signaling optimization to enable efficient transport of user data (IP or non-IP) through a user plane.

EPS service(s): a service(s) provided by a PS domain.

NAS signaling connection: a peer-to-peer S1 mode connection between a UE and an MME. An NAS signaling connection has a concatenation of an RRC connection via an LTE-Uu interface and an S1AP connection via an S1 interface.

UE using EPS services with control plane CIoT EPS optimization: UE attached for EPS services with control plane CIOT EPS optimization approved by a network Non-access stratum (NAS): a functional layer for exchanging an UMTS, signaling between a UE and a core network in an EPS protocol stack, and a traffic message. This has a main function of supporting the mobility of a UE and supporting a session management procedure of establishing and maintaining an IP connection between a UE and a PDN GW.

Access stratum (AS): this means a protocol layer under the NAS layer on the interface protocol between an E-UTRAN (eNB) and a UE or between an E-UTRAN (eNB) and an MME. For example, in the control plane protocol stack, the RRC layer, PDCP layer, RLC layer, MAC layer and PHY layer may be collectively referred to as an AS layer or any one of the layers may be referred to as an AS layer. Or, in the user plane protocol stack, the PDCP layer, RLC layer, MAC layer and PHY layer may be collectively referred to as an AS layer or any one of the layers may be referred to as an AS layer.

S1 mode: a mode applied to a system having functional separation according to the use of an S1 interface between a radio access network and a core network. The S1 mode includes a WB-S1 mode and an NB-S1 mode.

NB-S1 mode: this mode is applied by a UE when a serving radio access network of the UE provides access to a network service (via E-UTRA) based on a narrow band (NB)-Internet of things (IoT).

WB-S1 mode: this mode is applied when a system operates in the S1 mode, but is not the NB-S1 mode.

Cellular Internet of Things (CIoT) EPS Optimization

A cellular Internet of things (CIoT) has been defined to efficiently service low complexity UEs, such as Narrow Band (NB)-IoT and LTE MTC. That is, CIoT EPS optimization provides enhanced support for small data transmission.

Control plane (CP) CIoT EPS optimization (or CIoT EPS CP Optimization) and CIoT EPS user plane (UP) optimization (or UP CIoT EPS Optimization) capable of transmitting data through an SRB have now been defined. The two types of different data transmission modes can be supported by the same UE.

1) CP CIoT EPS optimization supports the efficient transport of user data (IP, non-IP or SMS) through a control plane via an MME without triggering data radio bearer establishment. The header compression of IP data may be optimally applied to an IP PDN type PDN connection configured to support header compression.

2) UP CIoT EPS optimization supports a change from the EMM-IDLE mode to the EMM-CONNECTED mode without a need to use a service request procedure.

A main cause of signaling overhead corresponds to a procedure now used in S1-based EPS architecture necessary for UE state transition (i.e., transition between the idle state and the connected state)).

In order to reduce such a related processing load within a network, a solution has been proposed based on reuse of information from a previous RRC connection for the following RRC connection setup.

This function is supported based on an eNB. That is, the resume of a previously suspended connection is limited to a cell(s) configured on an eNB whose connection has been previously suspended. In this case, this solution may be introduced and supported for a UE having transactions over multiple eNBs by introducing a cluster of eNBs that support UE context transport between eNBs through an X2 interface.

A signaling overhead reduction may be realized by two types of the following new procedures, that is, a "Connection Suspend procedure" and a "Connection Resume procedure."

FIG. 7 illustrates a connection suspend procedure initiated by a base station in a wireless communication system to which the present invention may be applied.

If a UE and a network support UP CIoT EPS optimization, this procedure is used to suspend a connection by the network.

1. An eNB initiates a connection suspend procedure with respect to an MME. The eNB indicates that the RRC connection of the UE will be suspended when the MME enters ECM-IDLE with respect to the MME.

Data, UE context and bearer context related to S1AP association necessary to result a connection are maintained in the eNB, the UE and the MME.

The eNB may include information on recommended cells and eNBs for paging in an S1 UE Context Suspend Request message. If this information is available, the MME may store the information in order to use it when the UE performs paging.

If this information is available, the eNB may include information for enhanced coverage in an S1 UE Context Suspend Request message.

2. The MME transmits a Release Access Bearers Request message to the S-GW in order to request the release of all of S1-U (S1 user plane) bearers for the UE.

3. An S-GW releases eNB-related information (i.e., an eNB address and a downlink tunnel endpoint identifier (TEID)(s)) for all of UEs. Furthermore, the S-GW sends a Release Access Bearers Response message to the MME as a response.

Other elements of the S-GW context of the UE are not affected. When a downlink packet for the UE arrives, the S-GW buffers the received downlink packet for the UE and initiates the Network Triggered Service Request procedure (refer to 3GPP TS 23.401).

The S-GW notifies the MME of the release of the S1-U bearer within the Release Access Bearers Response message.

4. The MME transmits the S1-AP UE Context Suspend Response message to the eNB in order to successfully complete the connection suspend procedure initiated by the eNB.

5. The eNB transmits an RRC message to the UE in order to suspend the RRC connection toward the UE.

If a UE NAS has been suspended in the EMM-IDLE state (i.e., if the UE is an EMM-IDLE mode with suspend indication), the UE needs to start a resume procedure in order to transmit uplink signaling or data.

FIG. 8 illustrates a connection resume procedure initiated by a terminal in a wireless communication system to which the present invention may be applied.

If a UE and a network supports UP CIoT EPS optimization and the UE stores information necessary to perform a connection resume procedure, this procedure is used to resume an ECM connection. If not, the Service Request procedure (refer to TS 23.401) is used.

1. A UE triggers a random access procedure (refer to FIG. 6) with respect to an eNB.

2. The UE triggers an RRC Connection Resume procedure including information required by the eNB in order to access the stored AS context of the UE.

An E-UTRAN performs security check.

EPS bearer state synchronization is performed between the UE and the network. That is, a radio bearer is not established in the UE, and the UE locally deletes an EPS bearer not a CP CIoT EPS bearer. If a radio bearer for a default EPS bearer is not established, the UE locally deactivates all of EPS bearers associated with the default EPS bearer.

3. The eNB notifies an MME that the RRC connection of the UE has been resumed within an S1-AP UE Context Resume Request message including a RRC resume cause. If the eNB cannot admit all of suspended bearers, the eNB indicates this within a list of rejected EPS bearers. The MME enters the ECM-CONNECTED state. The MME identifies whether the UE has returned to the eNB for the MME in which bearer context including data, UE context and DL TEID associated with S1AP association necessary to resume a connection has been stored.

If the default EPS bearer is not accepted by the eNB, all of EPS bearers associated with the default bearer are treated as non-accepted bearers. The MME releases non-accepted bearers and non-established bearers by triggering the bearer release procedure (refer to TS 24.301).

In order to assist a location service, the eNB indicates the coverage level of the UE with respect to the MME.

4. The MME acknowledges connection resume within an S1-AP UE Context Resume Response message. If the MME cannot admit all of suspended E-RABs, the MME indicates this within an E-RABs Failed To Resume List information element (IE).

5. If the MME has included an E-RABs Failed To Resume List in step 4, the eNB reconfigures a radio bearer.

6. Uplink data may be delivered from the UE to an S-GW by the eNB. The eNB transmits the uplink data to the S-GW using the S-GW address and TEID stored during the connection suspend procedure. The S-GW delivers the uplink data to a P-GW.

7. The MME transmits a Modify Bearer Request message to the S-GW for each PDN connection. The Modify Bearer Request message may include an eNB address, an S1 TEID for an accepted EPS bearer, a delay downlink packet notification request, and an RAT type.

Now the S-GW can transmit downlink data to the UE.

In order to memorize that which downlink data buffered for a UE using a power saving function, has been delivered and to prevent unnecessary user plane setup along with a subsequent TAU, the MME and the S-GW clear a DL Data Buffer Expiration Time within their UE context (if set).

8. The S-GW returns a Modify Bearer Response message to the MME as a response to the Modify Bearer Request message.

The Modify Bearer Response message may include an S-GW address and a TEID for uplink traffic.

Hereinafter, step 2 of FIG. 8, that is, the RRC Connection Resume procedure, is described more specifically.

When the UE has UE AS context, RRC Connection Resume is admitted by the E-UTRAN, and the UE needs to make transition from the RRC_IDLE state to the RRC_CONNECTED state, the resume of a suspended RRC connection is initiated by a higher layer (i.e., NAS layer).

When the RRC connection is resumed, an RRC layer configures the UE according to an RRC Connection Resume procedure based on stored UE AS context and an RRC configuration received from the E-UTRAN. The RRC Connection Resume procedure activates security again and reestablishes an SRB(s) and a DRB(s). The resume request of the RRC connection includes a resume identifier (resumeIdentity).

FIG. 9 illustrates an RRC connection resume procedure in a wireless communication system to which the present invention may be applied.

FIG. 11(a) illustrates the successful resume of an RRC connection.

Referring to FIG. 11(a), a UE (i.e., UE AS layer) transmits an RRC Connection Resume Request message to an E-UTRAN (e.g., eNB) in order to request the resume of a suspended RRC connection (S901a).

When an initial NAS message is generated, a UE NAS layer suspends a corresponding initial NAS message and transmits only an RRC establishment cause and a call type to the UE AS layer (i.e., a lower layer). As described above, when the RRC establishment cause and the call type are received from the NAS layer, the UE AS layer transmits the RRC Connection Resume Request message to the E-UTRAN.

The UE (i.e., UE AS layer) receives an RRC Connection Resume message for resuming the suspended RRC connection from the E-UTRAN as a response to the RRC Connection Resume Request message (S902a).

When the RRC Connection Resume message is received, the UE enters an RRC_CONNECTED state. Furthermore, when the RRC Connection Resume message is received, the UE AS layer indicates that the suspended RRC connection has been resumed with respect to a higher layer (i.e., NAS layer).

The UE (i.e., UE AS layer) transmits an RRC Connection Resume Complete message to the E-UTRAN in order to confirm the successful completion of the resume of the RRC connection (S903a).

FIG. 9(b) illustrates the resume of an RRC connection rejected or released by a network.

Referring to FIG. 9(b), a UE (i.e., UE AS layer) transmits an RRC Connection Resume Request message to an E-UTRAN (e.g., eNB) in order to request the resume of a suspended RRC connection (S901b).

The UE (i.e., UE AS layer) receives an RRC Connection Reject message for rejecting RRC connection setup from the E-UTRAN as a response to the RRC Connection Resume Request message (S902a).

When the RRC Connection Resume message is received, the UE AS layer notifies a higher layer (i.e., NAS layer) of a failure of the resume of the RRC connection.

Hereinafter, a behaviour in a NAS layer of the UE is described in detail as follows.

When an initial NAS message is generated, a UE NAS layer is pending the corresponding initial NAS message and transmits only a RRC establishment cause and a call type to a UE AS layer (i.e., the lower layer).

The UE AS layer performs the RRC connection resume as in the step 2 of FIG. 8 and informs the UE NAS layer about the success or failure of the resume. Upon notification of the success of the resume from the UE AS layer, the UE NAS layer determines whether to send the initial NAS message to the UE AS depending on a type of the pending initial NAS message. If the initial NAS message is needed to be sent, the UE NAS layer sends the initial NAS message to the UE AS layer. If not, the UE NAS layer discards the corresponding initial NAS message.

When UP CIoT EPS optimization is used, suspend of the NAS signaling connection may be initiated by a network that is in the EMM-CONNECTED mode. The resume of the suspended NAS signaling connection is initiated by the UE.

In the UE, when the UP CIoT EPS optimization is used:
Upon indication from the lower layers that the RRC connection has been suspended, the UE enters an EMM-IDLE mode with suspend indication, but does not consider that the NAS signaling connection has been released;

Upon trigger of a procedure using an initial NAS message when in the EMM-IDLE mode with suspend indication, the UE requests the lower layer to resume the RRC connection. In this request to the lower layer, the NAS layer provides an RRC establishment cause and a call type to the lower layer;

Upon indication from the lower layers that the RRC connection has been resumed when in the EMM-IDLE mode with suspend indication, the UE enters the EMM-CONNECTED mode. If a service request message is pending, the corresponding message is not sent. If an initial NAS message different from the service request message is pending, the corresponding message is sent. In this instance, if the NAS message is discarded and is not sent to the network, an uplink NAS count value corresponding to the corresponding message is reused for a next uplink NAS message to be sent;

In a WB-S1 mode, upon indication from the lower layers that the PLMN support of UP CIoT EPS optimization has not been received as part of broadcast system information when in the EMM-IDLE state with suspend indication, the UE enters the EMM-IDLE mode without suspend indication and considers that the NAS signaling connection has been released;

Upon indication from the lower layers that the RRC connection resume has been fallacked when in the EMM-IDLE state with suspend indication, the UE enters the EMM-IDLE mode without suspend indication, sends the pending initial NAS message, and proceeds as if the RRC connection establishment has been requested;

Upon indication from the lower layers that the RRC connection resume has failed and indication from the lower layers that the RRC connection has been suspended, the UE enters the EMM-IDLE mode with suspend indication and restarts an ongoing NAS procedure if required; and Upon indication from the lower layers that the RRC connection resume has failed and indication from the lower layers that the RRC connection has not been suspended, the UE enters the EMM-IDLE mode without suspend indication and restarts the ongoing NAS procedure if required.

In the network, when UP EPS optimization is used:
Upon indication from the lower layers that the RRC connection has been suspended, the network enters the EMM-IDLE mode with suspend indication, but does not consider that the NAS signaling connection has been released;

Upon indication from the lower layers that the RRC connection has been resumed when in the EMM-IDLE mode with suspend indication, the network enters the EMM-CONNECTED mode.

UE Behavior in Cell not Supporting User Plane (UP) CIoT EPS Optimization

FIG. 10 illustrates a scenario where a UE moves to a cell not supporting CIoT optimization belonging to a different TA in a wireless communication system to which the present invention is applicable.

Whether the UE can use CIoT optimization (i.e., UP CIoT EPS optimization (UP solution) and/or control plane (CP) CIoT EPS optimization (CP solution)) is determined in an Attach/Tracking Area Update (TAU) request procedure.

After that, if the UE moves to a cell not supporting CIoT optimization whose a tracking area (TA) is different from a stored TA, the UE can initiate a TAU request procedure, and the network can indicate to the UE that CIoT optimization is not accepted in a TAU Accept message. Therefore, the UE can transfer user data by using alternate methods instead of CIoT optimization which the cell does not support.

FIG. 11 illustrates a scenario where a UE moves to a cell not supporting CIoT optimization belonging to the same TA in a wireless communication system to which the present invention is applicable.

On the other hand, if the UE moves to a cell not supporting CIoT optimization whose a TA is the same as a stored TA, the UE cannot recognize that CIoT optimization would not be accepted in the NAS layer because the UE does not initiate a TAU request procedure. Thus, the UE cannot transfer any user data even though the UE initiates a control plane service request procedure for CP solution or a RRC connection resume procedure for UP solution in the cell not supporting CIoT optimization.

To address this problem, the following method has been proposed.

For the WB-S1 mode, if the support of CP solution is not broadcasted in system information block (SIB) 2, the UE initiates a service request procedure instead of the control plane service request procedure.

For the WB-S1 mode, if the support of UP solution is not broadcasted in the SIB 2, the UE initiates a RRC connection request procedure instead of the RRC connection resume procedure.

However, the method proposed above was postponed because 3GPP does not suppose a scenario that both the cell supporting CIoT optimization and the cell not supporting CIoT optimization are mixed in the same TA list. In other word, the UE does not move from the cell supporting CIoT optimization to the cell not supporting CIoT optimization without the TAU procedure.

A relationship between the support of CIoT and a tracking area identity (TAI) list in 3GPP is defined as follows:

[TS 23.401 section 4.3.5.3.] Other features (e.g. UP CIoT EPS Optimisation) may require the MME to adapt how it creates the list of TAIs.

Accordingly, basically, an operator may be required to match the support of CIoT optimization in all the cells in the same TA list. However, in the case of network misconfiguration or a transitional stage of introducing CIoT optimization, the cells not supporting CIoT optimization may be mixed in the same TAI list. For example, if the operator updates the existing eNB to introduce CIoT optimization, it may be difficult to update all the eNBs in the same TAI list at the same time and the cell not supporting CIoT optimization may remain. If such a situation occurs unexpectedly, a state in which the UE cannot transfer any user data needs to be avoided, and thus the following solutions were proposed.

If the UE moves to a cell not supporting a UP solution during a RRC IDLE mode with suspend indication, a RRC connection resume request is not accepted by the eNB even though the UE has user data pending. Thus, the UE cannot transfer any user data. To solve this issue, the following two solutions were proposed.

Alt (alternative) 1: Use the support of UP solution in SIB2

FIG. 12 illustrates a method of using the support of an UP solution in SIB2 in a wireless communication system to which the present invention is applicable. (도 12 에서 eNB1 이 두 곳 표시. 수정요망)

In a solution illustrated in FIG. 12, if the support of UP solution is not broadcasted in SIB2, the UE enters a RRC IDLE mode without suspend indication. If the UE transfers user data after the UE enters the RRC IDLE mode without suspend indication, the UE can send a RRC connection request and a service request as a usual bearer establishment procedure.

However, a fault of this solution is that it can be applied only for the WB-S1 mode because the support of UP solution is not defined in the SIB2 for a NB-S1 mode.

Alt 2: Release suspend mode after the failure of RRC connection resume request

FIG. 13 illustrates a method for releasing a suspend mode after the failure of a RRC connection resume request in a wireless communication system to which the present invention is applicable. (도 13 에서 eNB1 이 두 곳 표시. 수정요망)

If the UE transmits a RRC connection resume request to the eNB not supporting the UP solution, the eNB cannot receive it. Thus, this request will be ignored, and a timer T300 will expire. Considering this point, it was proposed that the UE enters the RRC IDLE mode without suspend indication after the timer T300 expires.

A similar UE behavior is already specified in NAS spec as follows:

[TS 24.301 section 5.3.1.3.]Upon indication from the lower layers that the RRC connection resume has failed and indication from the lower layers that the RRC connection has not been suspended, the UE enters the EMM-IDLE mode without suspend indication and restarts an ongoing NAS procedure if required.

On the other hands, the UE behavior in RRC layer is specified as follows:

[TS 36.331 section 5.3.3.6.] If the timer T300 expires, the RRC layer informs the upper layer about the failure to establish the RRC connection or the failure to resume the RRC connection with suspend indication.

If the above description is interpreted as that the RRC layer indicates the failure of the RRC connection resume request and RRC connection is suspended, the UE continues to enter the RRC IDLE mode with suspend indication. Thus, the UE cannot transfer any user data according to the above-described NAS spec.

Accordingly, in this solution, the UE behavior needs to be defined more clearly, so that the RRC layer indicates to the NAS layer that the RRC connection has not been suspended.

UE Behavior in Cell not Supporting User Plane CIoT EPS Optimization

1) UE behavior in NAS layer

As described above, in the WB-S1 mode, upon indication from the lower layers that the PLMN support of UP CIoT EPS optimization has not been received as part of broadcast system information in the EMM-IDLE state with suspend indication, the UE enters the EMM-IDLE mode without suspend indication and considers that the NAS signaling connection has been released.

2) UE behavior upon reception of RRC connection reject

The following represents a UE behavior when UE-AS receives a RRC connection reject.

The UE:

1> stops a timer T300;

1> resets MAC and releases MAC configuration;

1> except for NB-IoT, starts a timer T302 with a timer value that is set to the waitTime;

1> if the extendedWaitTime is present and the UE supports a delay tolerant access:

2> forwards the extendedWaitTime to the upper layer;

1> if deprioritisationReq is included and the UE supports the RRC connection reject with deprioritisation:

2> (re)starts a timer T325 with a timer value set to the deprioritisation timer signaled;

2> stores the deprioritisationReq until the timer T325 expires 3) the timers T302, T303, T305, T306 or T308 expire or stop.

The following represents a behavior of the UE-AS when the timer T302 expires.

The UE:

1> if the timer T302 expires or is stopped:

2> informs the upper layer about barring alleviation for mobile terminating access;

4) The UE behavior when a timer T3346 starts or is running

The following represents the UE behaviour for starting the timer T3346 and the UE behaviour when the timer T3346 is running. When the timer T3346 is running, except in special cases, the UE cannot perform a behaviour to send an initial NAS message including TAU.

A. Normal or periodic tracking area updating (TAU) procedure not accepted by a network If a TAU request is rejected due to a general NAS level mobility management congestion control, the network sets an EMM cause value to #22 "congestion" and assigns a back-off timer T3346.

22 (Congestion)

If a T3346 value information element (IE) is present in a TRACKING AREA UPDATE REJECT message, and a value indicates that this timer is neither zero nor deactivated, the UE proceeds to the following behavior. Otherwise, it is considered as an abnormal case.

The UE aborts a TAU procedure, resets a TAU attempt counter, and sets an ESP update status to 'EU2 NOT UPDATED'. If a rejected request is not for initiating a PDN connection for emergency bearer services, the UE changes state to EMM-REGISTERED.ATTEMPTING-TO-UPDATE.

The UE stops the timer T3346 if it is running

If the TRACKING AREA UPDATE REJECT message is integrity protected, the UE starts the timer T3346 with a value provided in the T3346 value IE.

If the TRACKING AREA UPDATE REJECT message is not integrity protected, the UE starts the timer T3346 with a random value.

The UE stays in a current serving cell and applies a normal cell reselection procedure. The TAU procedure is started, if still necessary, when the timer T3346 expires or is stopped.

If an A/Gb mode or an Iu mode is supported by the UE, the UE controls a GMM state, a GPRS update status, a routing area updating attempt counter that are GMM parameters when a routing area update procedure is rejected due to a GMM cause with the same value.

B. Abnormal cases in the UE

The following abnormal cases can be identified:

K) "Extended wait time" from the lower layer

If a tracking area update request message includes a low priority indicator set to "MS configures NAS signaling to low priority", the UE starts the timer T3346 at an "extended wait time" and resets a tracking area updating attempt counter.

If the tracking area update request message does not include the low priority indicator set to "MS configures NAS signaling to low priority" and the UE is operating in a NB-S1 mode, the UE starts the timer T3346 at the "extended wait time" and resets the tracking area updating attempt counter.

In other cases, the UE ignores the "extended wait time".

The UE aborts a TAU procedure, currently stays in a serving cell, sets an EPS update status to 'EU2 NOT UPDATED', changes the state to EMM-REGISTERED.ATTEMPTING-TO-UPDATE, and applies a normal cell reselection procedure.

If the UE has used extended IDLE mode discontinuous reception (eDRX) before initiating the TAU procedure, the UE continues to use the eDRX with extended DRX parameters IE received during a final Attach or TAU procedure.

The UE proceeds as follows.

L) The timer T3346 is running

The UE does not start the TAU procedure unless:

the UE is in an EMM-CONNECTED mode;

the UE receives a paging;

the UE is configured to use AC11-15 in selected PLMN;

the UE has an established PDN connection for emergency bearer services or is establishing a PDN connection for emergency bearer services; or the UE has a PDN connection without the NAS signaling low priority indication or is establishing a PDN connection without the NAS signaling low priority indication, and a timer T3402 and a timer T3411 are not running and a timer T3346 is started due to rejection of a NAS request message (e.g., ATTACH REQUEST, TRACKING AREA UPDATE REQUEST, EXTENDED SERVICE REQUEST) which includes the low priority indicator set to "MS configures NAS signaling to low priority".

The UE stays in a current serving cell and applies the normal cell reselection procedure.

Method for Determining EMM Mode

The above description has raised issues for the UE and has proposed solutions for the issues when the UE suspended in a cell supporting UP CIoT EPS optimization moves to a cell not supporting the UP CIoT EPS optimization.

In the case of a first solution Alt1, if the UE receives, from the base station, SIB including an indication that a corresponding cell does not support UP CIoT EPS optimization, the AS layer of the UE may inform the NAS layer about it, and the NAS layer of the UE may switch a state from an EMM-IDLE mode with suspend indication to an EMM-IDLE mode (without suspend indication).

However, in this method, when the UE moves to a cell not supporting UP CIoT EPS optimization in the EMM-IDLE mode with suspend indication and again returns to a cell supporting the UP CIoT EPS optimization in a state where any signaling (e.g., initial NAS message) or data transfer is not triggered, the UE unnecessarily results in releasing a suspend state. In other words, when the UE again returns to the cell supporting the UP CIoT EPS optimization in a short period of time, the UE unnecessarily results in releasing the suspend state.

For example, if the UE receives from the MME a T3346 timer value (e.g., if T3346 value IE is included in the TRACKING AREA UPDATE REJECT message), the UE cannot perform the TAU procedure while the timer T3346 is running. Further, even if bearing is performed in the AS layer, the UE cannot send a NAS message to the MME (i.e., the UE cannot perform the TAU procedure). In this case, even though the UE moves to the cell not supporting UP CIoT EPS optimization in the EMM-IDLE mode with suspend indication, the UE does not perform the TAU procedure. If the UE determines that the corresponding cell does not support UP CIoT EPS optimization via a SIB message received from the corresponding cell, the UE changes the state from the EMM-IDLE mode with suspend indication to the EMM-IDLE mode (without suspend indication). Afterward, when the UE again returns to the cell supporting UP CIoT EPS optimization, the UE has to perform again a RRC connection procedure because the UE has released the suspend state. That is, although the UE can initiate a RRC connection resume procedure if the UE has maintained the suspend state, there is a problem that the UE unnecessarily results in releasing the suspend state in the above situation.

Further, in the case of a second solution Alt2, there are problems of a delay in which the UE has to wait until the timer T300 expires after the UE first transmits a RRC connection resume request, and an increase in a signaling overhead in which the UE has to transmit a random access (RA) message 3 (i.e., RRC connection request message). Further, in this instance, a behaviour of the network (e.g., MME) is in a state not being currently defined.

To solve the above-described problem, the present invention proposes an efficient UE behavior when the UE (i.e., the UE in an EMM-IDLE mode with suspend indication) suspended in a cell supporting UP EPS CIoT optimization moves to a cell not supporting UP EPS CIoT optimization.

In the following description, an initial NAS message may include a conventional initial NAS message (e.g., a Service Request message, an Extended Service Request message, a TAU Request message, a Detach Request message) and a Control Plane Service Request message.

Further, in the following description, an EMM-IDLE mode without suspend indication is considered as the same meaning as a conventional EMM-IDLE mode.

FIG. 14 illustrates a method for determining a mode of a UE according to an embodiment of the present invention.

Referring to FIG. 14, if a UE in an EMM-IDLE mode with suspend indication receives, from the base station, a SIB including information that a serving cell of the UE does not support UP CIoT EPS optimization in S1401, the UE stores the information that the serving cell does not support the UP CIoT EPS optimization in S1402.

In this instance, a NAS layer or an AS layer of the UE may store the information that the serving cell does not support the UP CIoT EPS optimization.

If a procedure using an initial non-access stratum (NAS) message is triggered in S1403, the UE (i.e., the NAS layer of the UE) enters an EMM-IDLE mode without suspend indication in S1406.

After the procedure using the initial NAS message is triggered, the behavior of the UE and/or the MME is described in detail below.

On the other hand, if the procedure using the initial NAS message is not triggered in S1403, and the serving cell is changed to a cell supporting the UP CIoT EPS optimization (e.g., if the corresponding cell receives, from a cell on which the UE camps due to a movement of the UE, the SIB including information supporting the UP CIoT EPS optimization) in S1405, the UE (i.e., the NAS layer of the UE) maintains the EMM-IDLE mode with suspend indication in S1406.

In this instance, the UE can delete information that the serving cell does not support the UP CIoT EPS optimization, which has been stored in the step S1402.

Embodiment 1) UE Behavior

FIG. 15 illustrates a method for determining a mode of a UE according to an embodiment of the present invention.

Referring to FIG. 15, a non-access stratum (NAS) layer of the UE is an EMM-IDLE mode with suspend indication in S1501.

If an access stratum (AS) layer of the UE receives, from a cell (i.e., a serving cell) on which the UE currently camps, a SIB including information that the corresponding cell does not support UP CIoT EPS optimization in S1502, the AS layer of the UE can recognize it in S1503. That is, the AS layer of the UE can store the information that the serving cell does not support the UP CIoT EPS optimization.

The UE may perform one of behaviours A and B according to an event generated as follows.

A. If the UE is not changed to a cell supporting UP CIoT EPS optimization upon trigger of a procedure using an initial NAS message in the NAS layer of the UE If the UE is not changed to a cell supporting UP CIoT EPS optimization (i.e., the UE does not reselect the cell supporting the UP CIoT EPS optimization) upon trigger of a procedure using an initial NAS message in the NAS layer of the UE in S1504, the NAS layer of the UE may deliver to the AS layer of the UE a request (i.e., Resume Request) to resume a connection including a RRC establishment cause and a call type in S1505.

In this instance, the AS layer of the UE may send not a RRC Connection Resume Request message but a RRC Connection Request message to the corresponding cell (i.e., the eNB serving the corresponding cell) in S1506.

If the AS layer of the UE receives a RRC Connection Setup message that is a response to a success of the RRC Connection Request message in S1507, the AS layer of the UE may deliver to the NAS layer of the UE an indication (i.e., NAS message request indication) requesting the NAS layer of the UE to send a pending initial NAS message in S1508.

In this instance, the indication that the AS layer of the UE requests the NAS layer of the UE to send the pending initial NAS message may be a previously defined indication of 'the RRC connection resume has been fallbacked' or a newly defined indication.

The NAS layer of the UE receiving the request indication of the NAS message may send the pending initial NAS message to the AS layer of the UE in S1509 and may change to (i.e., enter) the EMM-IDLE mode without suspend indication in S1510.

The AS layer of the UE receiving the initial NAS message may send a RRC Connection Complete message to the corresponding cell (i.e., the eNB serving the corresponding cell) by including the received initial NAS message in the RRC Connection Complete message in S1511.

B. Case where a procedure using an initial NAS message is not triggered in the NAS layer of the UE and the UE is changed to a cell supporting UP CIoT EPS optimization When the UE again returns to a cell supporting UP CIoT EPS optimization in a state where a procedure using an initial NAS message is not triggered in the UE NAS layer, the UE proceeds as follows.

The UE AS layer may delete information that the serving cell does not support the UP CIoT EPS optimization, which has been stored in the step S1503. The UE NAS layer may maintain the EMM-IDLE mode with suspend indication.

As described above, even if the UE receives information, that a cell (i.e., the serving cell) on which the UE camps does not support the UP CIoT EPS optimization, via a SIB, the UE does not immediately enter the EMM-IDLE mode (without suspend indication). On the other hand, the UE may enter the EMM-IDLE mode (without suspend indication) after a procedure using an initial NAS message is triggered, namely, at a time when signaling and/or data transmission and reception actually start in the cell (i.e., the serving cell) on which the UE camps. Thus, if the UE again returns to a cell supporting the CIoT EPS optimization from a cell not supporting the CIoT EPS optimization without any signaling and/or data transmission and reception, the UE can reduce signaling with the eNB and a related processing load in the network by maintaining the EMM-IDLE mode with suspend indication.

Unlike FIG. 15, if the AS layer of the UE in the step S1507 is not a response (i.e., RRC Connection Setup message) to a success of a RRC Connection Request message, the UE may proceed as follows.

Case 1) If the AS layer of the UE receives a RRC Connection Reject message from the eNB after sending the RRC Connection Request message, the AS layer of the UE may deliver to the NAS layer of the UE an indication that a resume has failed and the RRC connection is not suspended.

In this instance, the indication may be 'an indication that the RRC connection resume has failed and an indication that the RRC connection is not suspended' that are previously defined, or a newly defined indication.

Case 2) If the AS layer of the UE does not receive any response from the eNB until the timer T300 expires after sending the RRC Connection Request message or is barred and does not transmit the RRC connection request to the eNB, the AS layer of the UE may comply a conventional behaviour of not a NB-IoT UE but a normal UE. Alternatively, the UE may perform a behaviour (i.e., delivering to the NAS layer of the UE an indication that the resume has failed and the RRC connection is not suspended) of the above Case 1).

A conventional behaviour of the above normal UE is as follows.

In the following, if the timer T302 is set to waitTime (see section 5.3.3.8 of TS 36.331) and expires, the AS layer of the UE may inform the upper layer (i.e., the NAS layer of the UE) about barring alleviation for mobile terminating access.

In the case of performing such a conventional behaviour, the AS layer of the UE may perform the behaviour (case I) (i.e., delivering to the NAS layer of the UE an indication that the resume has failed and the RRC connection is not suspended) of Case 1) together with the conventional behaviour.

Embodiment 2) UE Behaviour

FIG. 16 illustrates a method for determining a mode of a UE according to an embodiment of the present invention.

Referring to FIG. 16, a non-access stratum (NAS) layer of the UE is an EMM-IDLE mode with suspend indication in S1601.

If an access stratum (AS) layer of the UE receives, from a cell (i.e., a serving cell) on which the UE currently camps, a SIB including information that the corresponding cell does not support UP CIoT EPS optimization in S1602, the AS layer of the UE can inform the NAS layer of the UE about that the corresponding cell does not support the UP CIoT EPS optimization in S1603 (i.e., an indication that the corresponding cell does not support the UP CIoT EPS optimization).

The NAS layer of the UE receiving this can memorize this fact (i.e., the NAS layer of the UE may store information that the serving cell does not support the UP CIoT EPS optimization) in S1604.

The UE may perform one of behaviours A and B according to an event generated as follows.

A. If the UE is not changed to a cell supporting UP CIoT EPS optimization upon trigger of a procedure using an initial NAS message in the NAS layer of the UE Upon trigger of a procedure using an initial NAS message in the NAS layer of the UE while the UE is not changed to a cell supporting UP CIoT EPS optimization (i.e., the UE does not reselect the cell supporting the UP CIoT EPS optimization) in S1605, the NAS layer of the UE may change to (i.e., enter) an EMM-IDLE mode (i.e., EMM-IDLE mode without suspend indication) in S1606.

In this instance, the UE NAS layer may delete information that the serving cell does not support the UP CIoT EPS optimization, which has been stored in the step S1604.

The NAS layer of the UE may perform a behaviour for sending an initial NAS message in the EMM-IDLE mode (i.e., EMM-IDLE mode without suspend indication).

In this regard, the NAS layer of the UE may request the AS layer of the UE to establish an RRC connection in S1607. This request may include a RRC establishment cause and a call type together with the initial NAS message.

If the UE receives this request, the AS layer of the UE may send a RRC Connection Request message to the corresponding cell (i.e., the eNB serving the corresponding cell) in S1608.

If the AS layer of the UE receives a RRC Connection Setup message that is a response to a success of the RRC Connection Request message in S1609, the AS layer of the UE may send a RRC Connection Complete message to the corresponding cell (i.e., the eNB serving the corresponding cell) by including the received initial NAS message in the RRC Connection Complete message in S1610.

B. Case where a procedure using an initial NAS message is not triggered in the NAS layer of the UE and the UE is changed to a cell supporting UP CIoT EPS optimization When the UE again returns to a cell supporting UP CIoT EPS optimization in a state where a procedure using an initial NAS message is not triggered in the UE NAS layer, the UE proceeds as follows.

The UE NAS layer may delete information that the serving cell does not support the UP CIoT EPS optimization, which has been stored in the step S1604. The UE NAS layer may maintain the EMM-IDLE mode with suspend indication.

As described above, even if the UE receives information, that a cell (i.e., the serving cell) on which the UE camps does not support the UP CIoT EPS optimization, via a SIB, the UE does not immediately enter the EMM-IDLE mode (without suspend indication). On the other hand, the UE may enter the EMM-IDLE mode (without suspend indication) after a procedure using an initial NAS message is triggered, namely, at a time when signaling and/or data transmission and reception actually start in the cell (i.e., the serving cell)

on which the UE camps. Thus, if the UE again returns to a cell supporting the CIoT EPS optimization from a cell not supporting the CIoT EPS optimization without any signaling and/or data transmission and reception, the UE can reduce signaling with the eNB and a related processing load in the network by maintaining the EMM-IDLE mode with suspend indication.

Unlike FIG. 16, the UE behaviour may be as follows, when the NAS layer of the UE in the EMM-IDLE mode with suspend indication changes (i.e., reselect) the serving cell to a cell not supporting the UP CIoT EPS optimization, and then the AS layer of the UE does not send the initial NAS message to the eNB although the procedure using the initial NAS message has been triggered.

In this instance, the case where the AS layer of the UE fails to send the initial NAS message may include a case where transmission of a RRC Connection Request to the AS layer of the UE is barred by a barring mechanism, or a case where the AS layer of the UE receives a RRC Connection Reject message from the eNB. In this instance, the RRC Connection Reject message may include Extended Wait Time. For various reasons other than the above reasons, the UE may not be able to send the initial NAS message to the eNB. In addition, 3GPP TS 24.301 and 3GPP TS 36.331 documents may be incorporated by reference in the present specification.

When the AS layer of the UE fails to send the initial NAS message to the eNB as described above, the AS layer of the UE may inform the NAS layer of the UE about a transmission failure and its reason (e.g., access barred, lower layer failure, radio link failure, reject with extended wait timer, etc.).

The NAS layer of the UE receiving this may attempt to retransmit the initial NAS message, or if the retransmission is impossible (e.g., a back-timer is running by access barred, or the timer T3346 is running), the NAS layer can wait until the transmission is possible.

When the UE changes (e.g., returns) the serving cell to the cell supporting the UP CIoT EPS optimization while the NAS layer of the UE attempts to retransmit the initial NAS message or waits until transmission is possible, the NAS layer of the UE may enter the EMM-IDLE mode with suspend indication.

For such a behaviour, as in the step S1604 of FIG. 16, the NAS layer of the UE may memorize (i.e., store) that it has switched (i.e., entered) from the EMM-IDLE mode with suspend indication to the EMM-IDLE mode (without suspend indication).

More specifically, the NAS layer of the UE may change the serving cell to a cell not supporting the UP CIoT EPS optimization in the EMM-IDLE mode with suspend indication, and then may memorize (i.e., store) that the initial NAS message has been switched to the EMM-IDLE mode (without suspend indication) as the procedure using the initial NAS message is triggered.

As described above, while the NAS layer of the UE attempts to retransmit the initial NAS message or waits until transmission is possible, the NAS layer of the UE can monitor whether the transmission of the initial NAS message is a success or a failure.

If the transmission of the initial NAS message is the success, the NAS layer of the UE may delete the contents (information) that has been memorized (i.e., stored) in the step S1604 of FIG. 16 and perform an existing behaviour.

On the other hand, when the transmission of the initial NAS message is not successful in the cell not supporting the UP CIoT EPS optimization, and the UE changes the serving cell to the cell supporting the UP CIoT EPS optimization, the NAS layer of the UE may switch to (i.e., enter) the EMM-IDLE mode with suspend indication. Further, the NAS layer of the UE may delete the contents (information) that has memorized (i.e., stored) in the step S1604 of FIG. 16.

Embodiment 3) MME Behaviour

As illustrated in FIGS. 15 and 16, if the UE sends a RRC Connection Complete message including an initial NAS message to the eNB, the eNB delivers it to a MME by including the initial NAS message in a S1-AP message. The MME receiving the initial NAS message from the eNB operates as follows depending on whether or not a cell (eNB serving a cell) delivering the initial NAS message supports UP CIoT EPS optimization and/or whether or not the MME supports the UP CIoT EPS optimization.

1. If the cell has changed, but the MME is the same, a MME behaviour is as follows.

Hereinafter, it is assumed that the MME supports the UP CIoT EPS optimization.

If the MME receives the NAS message from a cell not supporting the UP CIoT EPS optimization, the corresponding UE switches a state from an EMM-IDLE mode with suspend indication to the EMM-IDLE mode (without suspend indication).

A determination that the MME has received the NAS message from the cell (or eNB) not supporting the UP CIoT EPS optimization is the configuration, and may know in advance the support or non-support of the corresponding cell (or eNB) or may be performed by a difference of the delivered S1-AP message.

Examples of the determination using the difference of the S1-AP message may include informing, by a MME-S1-AP layer, a MME-NAS layer about the difference. That is, the S1-AP message the eNB sends to the MME is different in the EMM-IDLE (RRC IDLE) mode with suspend indication and the EMM-IDLE mode (without suspend indication). Thus, the MME-S1-AP layer may determine whether or not a cell (or eNB) sending the corresponding S1-AP message supports the UP CIoT EPS optimization via the S1-AP message including the NAS message, and may inform the MME-NAS layer of it.

2. If the cell has changed, but the MME is different, a MME behaviour is as follows.

When a new MME supports the UP CIoT EPS optimization, the MME behaviour may be performed in the same manner as the MME behaviour in the above-described 1).

When the new MME does not support the UP CIoT EPS optimization, the corresponding UE switches a state from the EMM-IDLE mode with suspend indication to the EMM-IDLE mode (without suspend indication) irrespective of the support or non-support of the cell.

3. If RAT change is performed together with the cell change, a MME behaviour is as follows.

The MME switches a state of the corresponding UE from the EMM-IDLE mode with suspend indication to the EMM-IDLE mode (without suspend indication).

In the description of the present invention, 'a case where the UE NAS layer in the EMM-IDLE mode with suspend indication is changed to a cell supporting the UP CIoT EPS optimization in a state where a procedure using the initial NAS message is not triggered in a cell not supporting the UP CIoT EPS optimization' may be interpreted as the following case.

That is, the above case may correspond to a case where the NAS layer of the UE in the EMM-IDLE mode with suspend indication fails to initiate the transmission of the initial NAS message in the cell not supporting the UP CIoT EPS optimization due to the running of a NAS (E)MM back-off timer, and is changed to a cell supporting the UP CIoT EPS optimization.

Overview of Device to which the Present Invention is Applicable

FIG. 17 illustrates a block configuration diagram of a communication device according to an embodiment of the present invention.

Referring to FIG. 17, a wireless communication system includes a network node 1710 and a plurality of UEs 1720.

The network node 1710 includes a processor 1711, a memory 1712, and a communication module 1713. The processor 1711 implements functions, processes, and/or methods proposed in FIGS. 1 to 16. Layers of wired/wireless interface protocol may be implemented by the processor 1711.

The memory 1712 is connected to the processor 1711 and stores various types of information for driving the processor 1711. The communication module 1713 is connected to the processor 1711 and transmits and/or receives wired/wireless signals. Examples of the network node 1710 include a base station, MME, HSS, SGW, PGW, SCEF, SCS/AS, and the like. In particular, when the network node 1710 is the base station, the communication module 1713 may include a radio frequency (RF) unit for transmitting/receiving a radio signal.

The UE 1720 includes a processor 1721, a memory 1722, and a communication module (or RF unit) 1723. The processor 1721 implements functions, processes, and/or methods proposed in FIGS. 1 to 16. Layers of a radio interface protocol may be implemented by the processor 1721. In particular, the processor may include a NAS layer and an AS layer. The memory 1722 is connected to the processor 1721 and stores various types of information for driving the processor 1721. The communication module 1723 is connected to the processor 1721 and transmits and/or receives a radio signal.

The memories 1712 and 1722 may be inside or outside the processors 1711 and 1721 and may be connected to the processors 1711 and 1721 through various well-known means. Further, the network node 1710 (in case of the base station) and/or the UE 1720 may have a single antenna or multiple antennas.

FIG. 18 illustrates a block configuration diagram of a communication device according to an embodiment of the present invention.

In particular, FIG. 18 illustrates the UE illustrated in FIG. 17 in more detail.

Referring to FIG. 18, the UE may include a processor (or digital signal processor (DSP)) 1810, an RF module (or RF unit) 1835, a power management module 1805, an antenna 1840, a battery 1855, a display 1815, a keypad 1820, a memory 1830, a subscriber identification module (SIM) card 1825 (which is optional), a speaker 1845, and a microphone 1850. The UE may also include a single antenna or multiple antennas.

The processor 1810 implements functions, processes, and/or methods proposed in FIGS. 1 to 16. Layers of a radio interface protocol may be implemented by the processor 1810.

The memory 1830 is connected to the processor 1810 and stores information related to operations of the processor 1810. The memory 1830 may be inside or outside the processor 1810 and may be connected to the processors 1810 through various well-known means.

A user inputs instructional information, such as a telephone number, for example, by pushing (or touching) buttons of the keypad 1820 or by voice activation using the microphone 1850. The processor 1810 receives and processes the instructional information to perform an appropriate function, such as to dial the telephone number. Operational data may be extracted from the SIM card 1825 or the memory 1830. Further, the processor 1810 may display instructional information or operational information on the display 1815 for the user's reference and convenience.

The RF module 1835 is connected to the processor 1810 and transmits and/or receives an RF signal. The processor 1810 delivers instructional information to the RF module 1835 in order to initiate communication, for example, transmit radio signals configuring voice communication data. The RF module 1835 consists of a receiver and a transmitter to receive and transmit radio signals. The antenna 1840 functions to transmit and receive radio signals. Upon reception of the radio signals, the RF module 1835 may transfer signals for processing by the processor 1810 and convert the signal into a baseband. The processed signal may be converted into audible or readable information output via the speaker 1845.

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the present invention has been described focusing on examples applying to the 3GPP LTE/LTE-A system, it can be applied to various wireless communication systems, particularly 5G (5 generation) systems other than the 3GPP LTE/LTE-A system.

The invention claimed is:

1. A method for determining, by a user equipment (UE), an evolved packet system (EPS) mobility management (EMM) mode in a wireless communication system, the method comprising:
    receiving, by the UE in an EMM-IDLE mode with suspend indication, from a base station, a system information block (SIB) including information that a serving cell of the UE does not support user plane (UP) cellular Internet of Things (CIoT) EPS optimization;
    storing the information that the serving cell does not support the UP CIoT EPS optimization;
    maintaining the EMM-IDLE mode with suspend indication when a procedure using an initial non-access stratum (NAS) message is not triggered and the serving cell is changed to a cell supporting the UP CIoT EPS optimization;
    after the procedure using the initial NAS message is triggered, entering a NAS layer of the UE in the EMM-IDLE mode without suspend indication;
    wherein an access stratum (AS) layer of the UE stores the information that the serving cell does not support the UP CIoT EPS optimization,
    wherein when the NAS layer of the UE requests the AS layer of the UE to resume a radio resource control (RRC) connection while the information that the serving cell does not support the UP CIoT EPS optimization is stored, the AS layer of the UE sends a RRC connection request message to the base station,
    wherein when the AS layer of the UE receives from the base station a RRC connection setup message as a response to the RRC connection request message, the AS layer of the UE transmits a request of the initial NAS message to the NAS layer of the UE.

2. The method of claim 1, wherein when the procedure using the initial NAS message is not triggered and the serving cell is changed to the cell supporting the UP CIoT EPS optimization, the information that the serving cell does not support the UP CIoT EPS optimization is deleted.

3. The method of claim 1, wherein the request of the initial NAS message is an indication that a RRC connection resume has fallbacked.

4. The method of claim 1, wherein if the NAS layer of the UE receives the request of the initial NAS message, the NAS layer of the UE sends the initial NAS message to the AS layer of the UE and enters the EMM-IDLE mode without suspend indication.

5. The method of claim 1, wherein the AS layer of the UE delivers to the NAS layer of the UE the information that the serving cell does not support the UP CIoT EPS optimization.

6. The method of claim 5, wherein the NAS layer of the UE stores the information that the serving cell does not support the UP CIoT EPS optimization.

7. A user equipment (UE) for determining an evolved packet system (EPS) mobility management (EMM) mode in a wireless communication system, the UE comprising:
    a transmitter and a receiver configured to transmit and receive a signal; and
    a processor configured to control the transmitter and receiver,
    wherein the processor is configured to:
    receive, by the UE in an EMM-IDLE mode with suspend indication, from a base station a system information block (SIB) including information that a serving cell of the UE does not support user plane (UP) cellular Internet of Things (CIoT) EPS optimization;
    store the information that the serving cell does not support the UP CIoT EPS optimization;
    maintain the EMM-IDLE mode with suspend indication when a procedure using an initial non-access stratum (NAS) message is not triggered and the serving cell is changed to a cell supporting the UP CIoT EPS optimization, and
    after the procedure using the initial NAS message is triggered, enter a NAS layer of the UE in the EMM-IDLE mode without suspend indication;
    wherein an access stratum (AS) layer of the UE stores the information that the serving cell does not support the UP CIoT EPS optimization, and
    wherein when the NAS layer of the UE requests the AS layer of the UE to resume a radio resource control (RRC) connection while the information that the serving cell does not support the UP CIoT EPS optimization is stored, the AS layer of the UE sends a RRC connection request message to the base station,
    wherein when the AS layer of the UE receives from the base station a RRC connection setup message as a response to the RRC connection request message, the AS layer of the UE transmits a request of the initial NAS message to the NAS layer of the UE.

* * * * *